United States Patent [19]
Seitz

[11] 3,811,014

[45] May 14, 1974

[54] ADAPTIVE PULSE CODE MODULATION SYSTEM

[75] Inventor: Neal B. Seitz, San Diego, Calif.

[73] Assignee: Logicon, Inc., Hawthorne, Calif.

[22] Filed: Mar. 12, 1973

[21] Appl. No.: 340,562

[52] U.S. Cl. .......... 179/15 BW
[51] Int. Cl. .......... H04j 3/00
[58] Field of Search ...... 179/15 BW, 15 BY, 15 BA, 179/15.55 R, 15 AS; 178/50

[56] References Cited

UNITED STATES PATENTS

| | | | |
|---|---|---|---|
| 3,529,089 | 9/1970 | Davis et al. | 179/15 |
| 3,588,364 | 6/1971 | Wallingford | 179/15 |
| 3,591,722 | 7/1971 | Palsa | 179/2 |
| 3,660,605 | 5/1972 | Rees | 179/15 AS |
| 3,711,650 | 1/1973 | Kuhn et al. | 179/15 BW |

*Primary Examiner*—Kathleen H. Claffy
*Assistant Examiner*—Joseph A. Popek
*Attorney, Agent, or Firm*—Lindenberg, Freilich & Wasserman

[57] ABSTRACT

An adaptive pulse code modulation system useful for increasing the channel capacity of a fixed bandwidth communication link by reducing the redundancy characteristic of nonadaptive systems. In the subject system, the transmitter allocates space in a fixed bit length sample field amongst multiple channels on a frame by frame basis. Each channel is assigned space in the sample field only when that channel is active. The activity status of each channel is determined by averaging the sample amplitudes from that channel over a specified number of frames and if that average exceeds a specified threshold, then that channel is defined to be active. The activity status of each channel is monitored at a very high rate so that when a user begins speaking, his voice will be detected and assigned space soon enough to prevent his speech from being noticeably clipped. Each frame includes at least three fields; (1) an active channel sample field, (2) an activity status field and (3) an activity sync field. The activity status field is used to represent the activity status of a different channel each frame. Thus, in a typical 30 channel system, the activity status of each channel will be reported once every 30 frames. The activity sync field is comprised of one bit which enables the receiver to assign each received activity status field to the proper channel. In constructing a frame, the transmitter samples each voice channel and allocates a portion of the adaptive sample field to each active channel leaving vacant space if the complete sample field is not required and "rounding off" the samples to "fit" them in the sample field if an unusually large number of channels are active. To process each incoming frame, the receiver counts the total number of active channels, determines the number of bits per sample, and then rescales the received samples back to full magnitude if they were rounded off.

14 Claims, 21 Drawing Figures

ADAPTIVE PULSE CODE MODULATION SYSTEM

BACKGROUND OF THE INVENTION

1. Field of the Invention

This invention relates to an adaptive pulse code modulation system particularly useful in applications involving the multiplexed transmission of multiple voice channels.

2. Description of the Prior Art

The Bell T1 Carrier System is typical of state of the art pulse code modulation (PCM) systems for use in the transmission of a plurality of multiplexed voice channels. The T1 carrier frame format is normally comprised of 193 bits including a single sync bit and 24 groups of eight bits, each eight bit group being dedicated to a different one of 24 voice channels. Within each eight bit group, one bit carries supervisory and signalling information and the other seven bits contain a quantized sample of the voice signal voltage. The seven bits, of course, are able to define 128 ($\pm 64$) different levels.

U.S. Pat. No. 3,711,650 discloses an adaptive PCM system in which frame space is allocated amongst N channels on an adaptive frame by frame basis. Only a minimum number of bits are assigned to each inactive channel and only the number of bits required to preserve the sample value at the desired precision are assigned to active channels.

SUMMARY OF THE INVENTION

It is an object of the present invention to provide an improved PCM system which yields a greater channel capacity than existing systems or alternatively which provides better quality transmission for the same channel capacity.

In accordance with the present invention, frame space is adaptively allocated, on a frame by frame basis, to represent the amplitude of each of N voice channels. The allocation criteria involves assigning space in a frame only to those of the N channels that are active. The activity status of each channel is determined by averaging the sample amplitudes from that channel over a specified number of frames and if that average exceeds a specified threshold, then that channel is defined to be active. Frequent monitoring of the activity status of each channel prevents noticeable speech clipping when a user begins speaking.

A frame in accordance with the invention includes at least three fields; (1) an active channel sample field; (2) an activity status field, and (3) an activity sync field. The activity status field of each frame is used to represent the activity status of a different channel. Thus, in a typical thirty channel system, the activity status of each channel will be reported once every 30 frames. The activity sync field is comprised of one bit which enables the receiver to assign each received activity status field to the appropriate one of the multiple channels. In constructing a frame, the transmitter samples each voice channel and allocates a portion of the active channel sample field to each active channel leaving a vacant space if the complete sample field is not required and "rounding off" the samples to "fit" them in the sample field if an unusually large number of channels are active. To process each incoming frame, the receiver counts the total number of active channels, determines the number of bits which have been allocated to each channel sample, and then rescales the received samples back to full magnitude if they were rounded off.

BRIEF DESCRIPTION OF THE DRAWINGS

In the following descriptions of the various figures, key portions have been underlined to function as figure titles which may be later referred to herein.

DESCRIPTION OF THE PREFERRED EMBODIMENT

FIG. 1 — PRIOR ART PCM FRAME

In most conventional PCM systems, frames are transmitted successively at an 8 kc rate so that a new frame transmission begins every 125 microseconds. A typical conventional frame format consists of a frame sync bit, a fixed bit length signalling field, and a sample field. For the sake of brevity and clarity, the signalling field has been omitted from the frame format illustrated in FIG. 1. The signalling field normally provides the information required to establish and terminate connections (e.g. dial pulses, busy signals, etc.)

Figure 1:
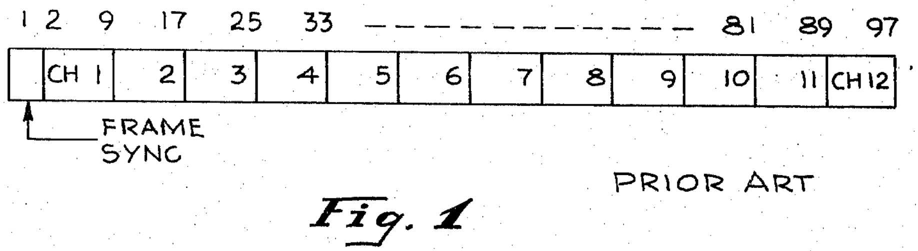
FIG. 1 illustrates the format of a typical prior art PCM frame.

The frame illustrated in FIG. 1 is comprised of 97 bits for the frame sync bit and sample field. Bit 1 of each frame constitutes the frame sync bit and is used to enable the receiver to identify the beginning of each successive frame. The frame sync bit normally follows an alternating . . . 101010 . . . sequence in successive frames. Such a pattern cannot exist for long in the voice samples because it represents a 4 kc frequency, which would be blocked by the voice input filters (not shown). Ninety six bits (i.e. bits 2–97) illustrated in FIG. 1 constitute the sample field and function to carry the actual speech information for each of the voice channels being multiplexed. In conventional PCM systems, the sample field is divided into equal segments, each of which contains the pulse code for one specific channel. Thus, if the frame format of FIG. 1 corresponded to a 12 channel system, then the 96 bit sample field would be divided into 12 subfields, each subfield containing eight bits representing the digital value of the voice signal on the corresponding channel.

The present invention is directed to an improved system for differently allocating the 97 bits of the typical frame shown in FIG. 1 in order to increase channel capacity or alternatively yield better quality transmission for the same channel capacity. Briefly, a system in accordance with the invention provides a means of increasing the number of voice signals that can be transmitted over a PCM communication link of fixed bandwidth by taking advantage of redundancy inherently present in human speech patterns. Channel capacity is increased by assigning frame space to the multiple voice channels on an adaptive, frame by frame basis, as needed. Each channel is assigned a space in the sample field of a frame only when that channel is active. Since it is usual for several channels in a multiple channel system to be inactive at any particular point in time, and since no frame space is alotted to inactive channels in accordance with the present invention, it follows that a system in accordance with the invention can accommodate a greater number of overall voice channels than a conventional PCM system.

FIG. 2 — ADAPTIVE FRAME FORMAT

In accordance with the present invention, the activity status (i.e. active or inactive) of each voice channel is determined by averaging the voice sample amplitudes (or pulse code representations thereof) from that channel over a specified number of frames. If the average sample amplitude for a particular channel exceeds a specified threshold, then that channel is defined to be active; if the average sample amplitude does not exceed the specified threshold, then the channel is temporarily defined to be inactive. The activity status of each channel is monitored at a sufficiently fast rate so that when a user begins speaking his voice will be detected and assigned channel space soon enough to prevent his speech from being noticeably clipped.

Figure 2:
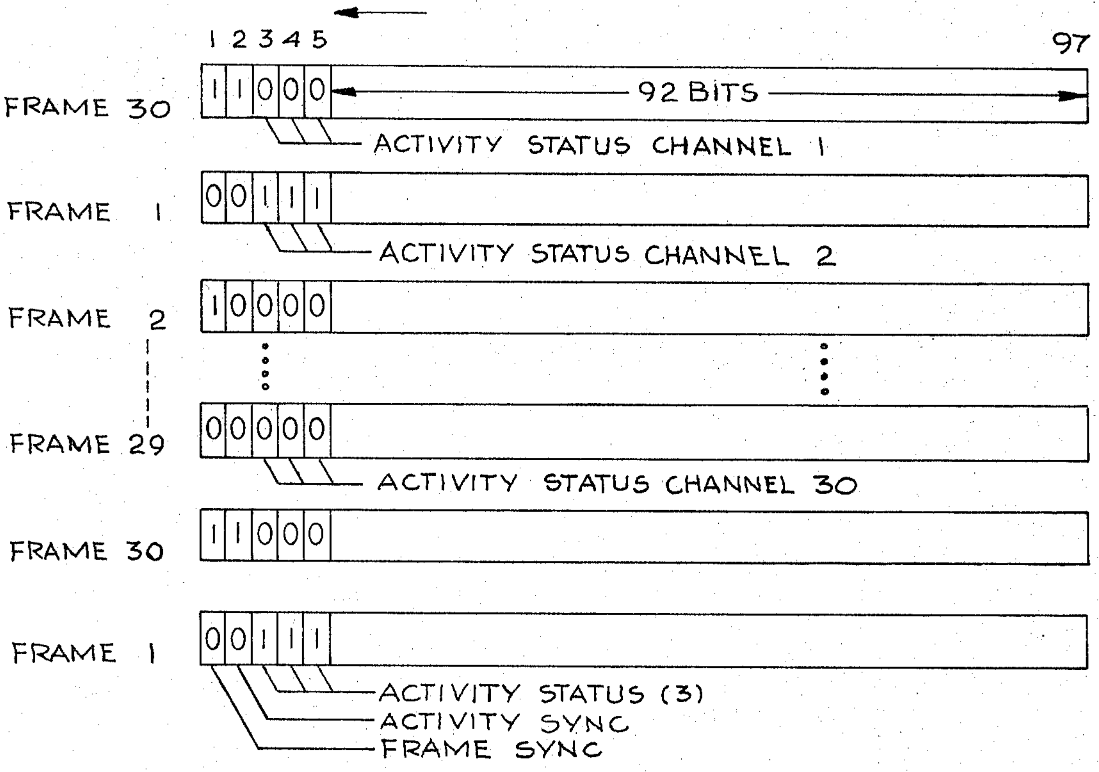
FIG. 2 illustrates several successive PCM frames in accordance with the invention showing the adaptive frame format.

In describing a system in accordance with the invention, a 30 channel system and a 97 bit frame will be assumed. As represented in FIG. 2, a frame in accordance with the present invention is comprised of a frame sync bit (bit 1), and activity sync bit (bit 2), an activity status field (bits 3–5), and an active channel sample field (bits 6–97). It should be recognized that the foregoing omits reference to a signalling field. However, since a signalling field employed in a system in accordance with the present invention can be identical to signalling fields employed in prior art systems, it is not considered necessary to discuss it in detail herein.

FIG. 2 shows a sequence of frames in accordance with the invention. As will be seen hereinafter, frame counter means are provided to define 30 count frame cycles, each frame within a cycle respectively corresponding to a different one of 30 voice channels. The frame sync bit (bit 1) is used in accordance with the present invention as it is in prior art systems. Thus, the frame sync bit is alternately 1 and 0 in successive frames. As shown in FIG. 2, it will be assumed that the frame sync bit is 1 in odd numbered (1, 3, 5, . . . 29) frames and 0 in even numbered (2, 4, 6, . . . 30) frames.

The activity sync bit (bit 2) is 1 during only one frame (frame 30) per frame cycle and is 0 is each of the 29 subsequent frames in each frame cycle. The activity sync bit provides a time reference point to the receiver once per frame cycle.

The activity status field of each of the 30 frames within a frame cycle denotes the activity status of a different voice channel. Each activity status field actually requires only a single bit to represent whether the corresponding voice channel is active or inactive. However, to reduce the probability of a transmission error garbeling the activity status information, it is desirable to transmit that information redundantly. Thus, each activity status field is illustrated as containing three bits which, in the absence of transmission errors, will be identical. For convenience, it will be assumed herein that the activity status fields of frames 1–30 respectively represent the activity status of channels 2,3, . . . 30, 1. In an exemplary situation illustrated in FIG. 2, only channel 2 is represented as being active.

FIG. 3 — TRANSMITTER

FIG. 4 — TRANSMITTER MODE TIMING

Prior to considering the structural aspects of a transmitter in accordance with the present invention, the functional requirements of the transmitter will be discussed. Briefly, during each frame period, assumed to have a 125 microsecond duration, the transmitter must accomplish the following four basic functions which are respectively executed in the four operational modes shown in FIG. 4:

1. Input; Obtain 8-bit digital samples from each of 30 input (voice) channels carrying analog information.
2. Activity Update; Compute the activity status of one channel by averaging its sample amplitudes over the previous 30 frames.
3. Segmentation; Determine the proper segmentation of the 92 bit active channel sample field (bits 6–97) based on the number of channels active.
4. Output; construct a 97-bit PCM frame containing the updated activity status information and the pulse code representation of each active channel.

While these four functions are being accomplished, the transmitter will simultaneously output the frame constructed during the previous frame period to the communication link.

In performing function (1), the transmitter will sample, at specific instants during each frame period, the analog signals present on each of 30 input voice channels and convert each analog sample to an 8-bit signed-magnitude binary number.

In performing function (2), the transmitter will store the 30 8-bit digital samples and will add the (absolute) magnitude of each sample to an accumulating 30-frame total for that channel. The transmitter will update the stored activity status of one channel by comparing the 30-frame total for that channel with a specified threshold number. If the 30-frame total exceeds the threshold, the transmitter will store the activity status for that channel as "active". If the 30-frame total is less than the threshold, the transmitter will store the activity status for that channel as "inactive". The transmitter will then reset the 30-frame total for the channel just updated and will set the three activity status bits in the frame being constructed to reflect the new activity status of that channel. The 30-frame averaging periods for the various channels will be staggered; for example, if the channel 1 activity status were averaged over frames 1–30 of the same frame cycle, then channel 2 activity status would be averaged over frames 2–30 of that frame cycle and frame 1 of the next frame cycle. The activity status of each channel will be reported in the last frame of the frames over which it is averaged.

In performing function (3), the transmitter will use the stored activity status information to compute the total number of voice channels currently active. Based on this total, the transmitter will compute for each active channel a "slot length" in the sample field of the frame being constructed. If the number of active channels (A) is eleven or less ($8A<92$) the slot length for each channel will be eight bits. If the number of active channels is twelve or greater ($8A>92$), the transmitter will compute the fraction 92/A, obtaining the result in the form of a whole number quotient A and a whole number remainder R. The transmitter will then assign (A–R) of the active channels a slot length of Q bits and the other R active channels a slot length of Q+1 bits. This scheme will ensure full utilization of the 92 bit active channel sample field during overflow periods. In order to ensure equal signal quality for all channels during temporary overflow periods, the R remainder bits are assigned to the various active channels with equal frequency; that is, no active channel is assigned a slot length Q+1 during more overflow frames than the others. The transmitter will meet this requirement by assigning the remainder bits to the active channels on a cyclic basis, using a modulo-30 frame count (based on the activity sync bit) as an index. As an example, assume that channels 1 and 3 through 15 are active. Then Q is 92/14, or 6, and R is $92-(6\times14)=8$. For as many frames as this activity status continues, six channels can be assigned a slot length of Q (6) bits and eight channels can be assigned a slot length of Q +1 (7) bits. Assume that during the first frame in which this overflow exists, the frame count equals 10. Then the eight available "remainder" bit positions in the frame would be assigned to the first eight active channels after channel 10, i.e., channels 11, 12, 13, 14, 15, 1, 3 and 4. These channels would have slot length of seven bits while the other six active channels would have slot length of six. During the next frame (frame 11) the eight available remainder bits would be assigned to the first eight active channels after channel 11, i.e., channels 12, 13, 14, 15, 1, 3, 4, and 5. The group of R channels assigned (Q + 1) bits will thus be shifted by one channel each frame, to ensure that the active channels have uniform quality during overflow periods.

In performing function (4), the transmitter will proceed to construct a 92-bit sample field consisting of the samples from the active channels, truncated to computed slot lengths Q or (Q + 1). Only active channels will be assigned space in the sample field. The active channels will be arranged in the sample field in numerical order by channels. As an example, frame 10 of the preceding paragraph would be constructed as follows:

| Channel | Sample Field Bits | Sample Size |
|---|---|---|
| 1 | 1–7 | 7 |
| 3 | 8–14 | 7 |
| 4 | 15–21 | 7 |
| 5 | 22–28 | 6 |
| 6 | 29–34 | 6 |
| 7 | 35–40 | 6 |
| 8 | 41–46 | 6 |
| 9 | 47–52 | 6 |
| 10 | 53–58 | 6 |
| 11 | 59–64 | 7 |
| 12 | 65–71 | 7 |
| 13 | 72–78 | 7 |
| 14 | 79–85 | 7 |
| 15 | 86–92 | 7 |

The samples will be placed in slots in the sample field such that the most significant bits (MSB's) will be transmitted first. Truncation of the samples from eight bits to Q or (Q+1) bits in length will be accomplished (when required) by dropping the least significant 8 – Q or 8 – (Q+1) bits. A round-off process performed at the receiver will minimize the truncation error.

In order to enable the receiver to determine which channel's activity status is being reported in each frame, the transmitter will place a "1" in the activity sync bit position during construction of frame 30 in each frame cycle. The channel 1 activity status is reported during frame 30. During all other frames the transmitter will set this bit to $\phi$. In order to enable the receiver to locate the beginning of each frame, the transmitter will place a "1" in the frame sync bit position of every odd numbered frame, and a "$\phi$" in the frame sync bit position of every even numbered frame.

Figure 4:
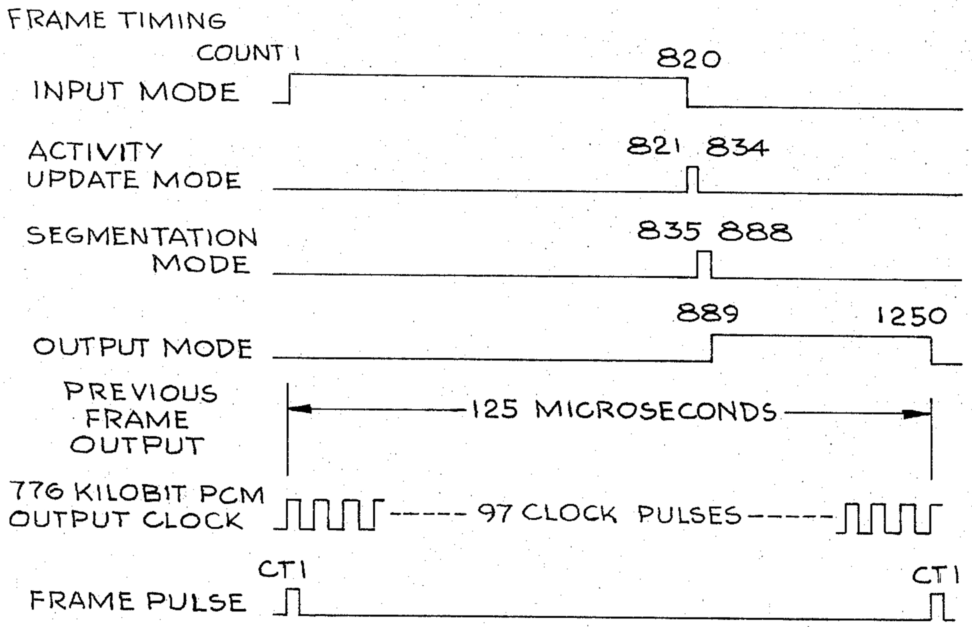
FIG. 4 is a timing diagram showing the transmitter mode timing within a frame.

FIG. 4 illustrates the transmitter mode timing. During each 125 microsecond frame period 1,250 counts are generated. In the interval from count 1 to count 820, the Input function is executed. In the interval from count 821 to count 834, the Activity Update function is executed. Similarly, the Segmentation function is executed between counts 835 and 888 and the Output function is executed between counts 889 and 1,250.

During the Input Mode, the Analog Switches AS-1–AS6 and Sample/Converter circuits SC1–SC6 obtain an analog sample of each of the 30 voice input signals and transform each sample into an 8-bit digital number. Each digital sample is transferred via the Channel Select Gate Logic into one of 30 8-bit Sample registers, and its magnitude is simultaneously added to one of 30 12-bit Sum Registers each accumulating a 30-frame total.

During the Activity Update Mode, the Activity Status Logic (FIG. 3) computes the current activity status of a selected channel based on the 30-frame "average sample magnitude" stored in the Sum Register for that channel. A different channel's activity status is updated each frame, as determined by the current frame count. A given channel's activity status is updated once every 30 frames and the corresponding Sum Register reset to zero.

During the Segmentation Mode, the Segmentation Control Logic (FIG. 3) determines the proper allocation of the 92 bits in the active channel sample field based on the activity status information and the current frame count. During the Output Mode, the Output Control circuit constructs the new PCM frame by transferring samples from the "active" Sample Registers into whichever Output Register is not currently supplying data to the communication link. The number of bits output from each active Sample Register is controlled by frame format information supplied by the Segmentation Control Logic. While the transmitter is constructing a new frame in one Output Register, the the frame constructed during the preceeding 125 microsecond frame period is output to the Communication Link from the other Output Register. The two Output Registers exchange functions each frame.

FIG. 5 — TRANSMITTER INPUT MODE LOGIC

FIG. 6 — TRANSMITTER INPUT MODE TIMING

Figure 6:
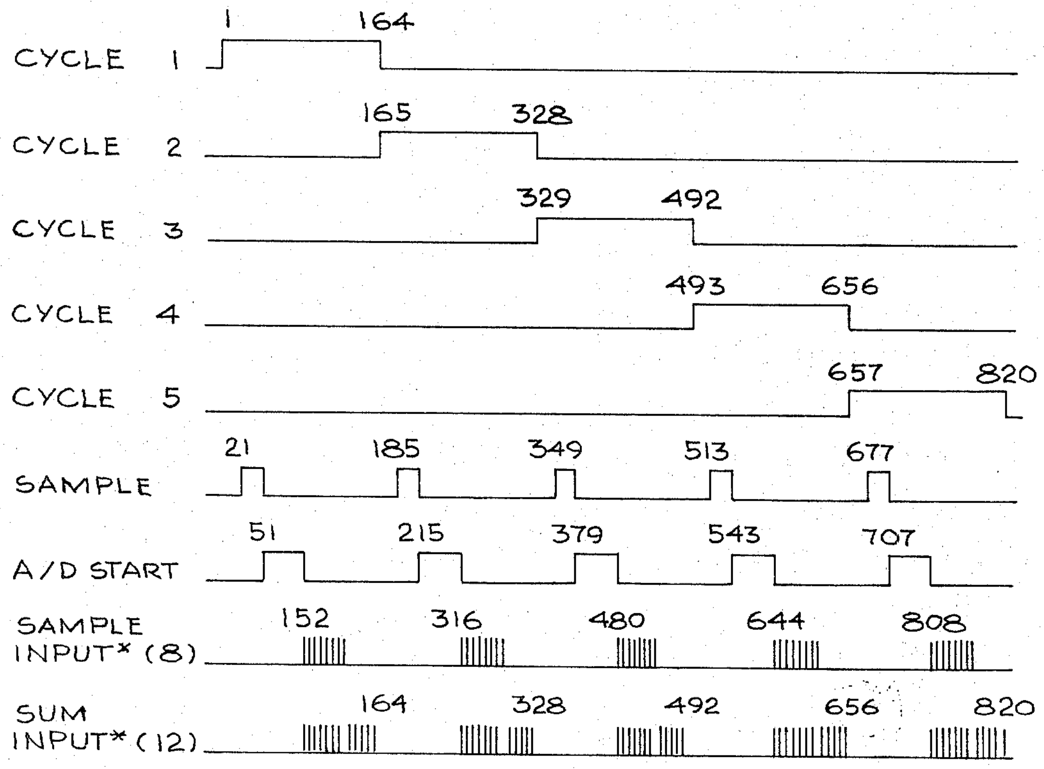
FIG. 6 is a timing diagram illustrating the transmitter input mode timing.
Figure 5:
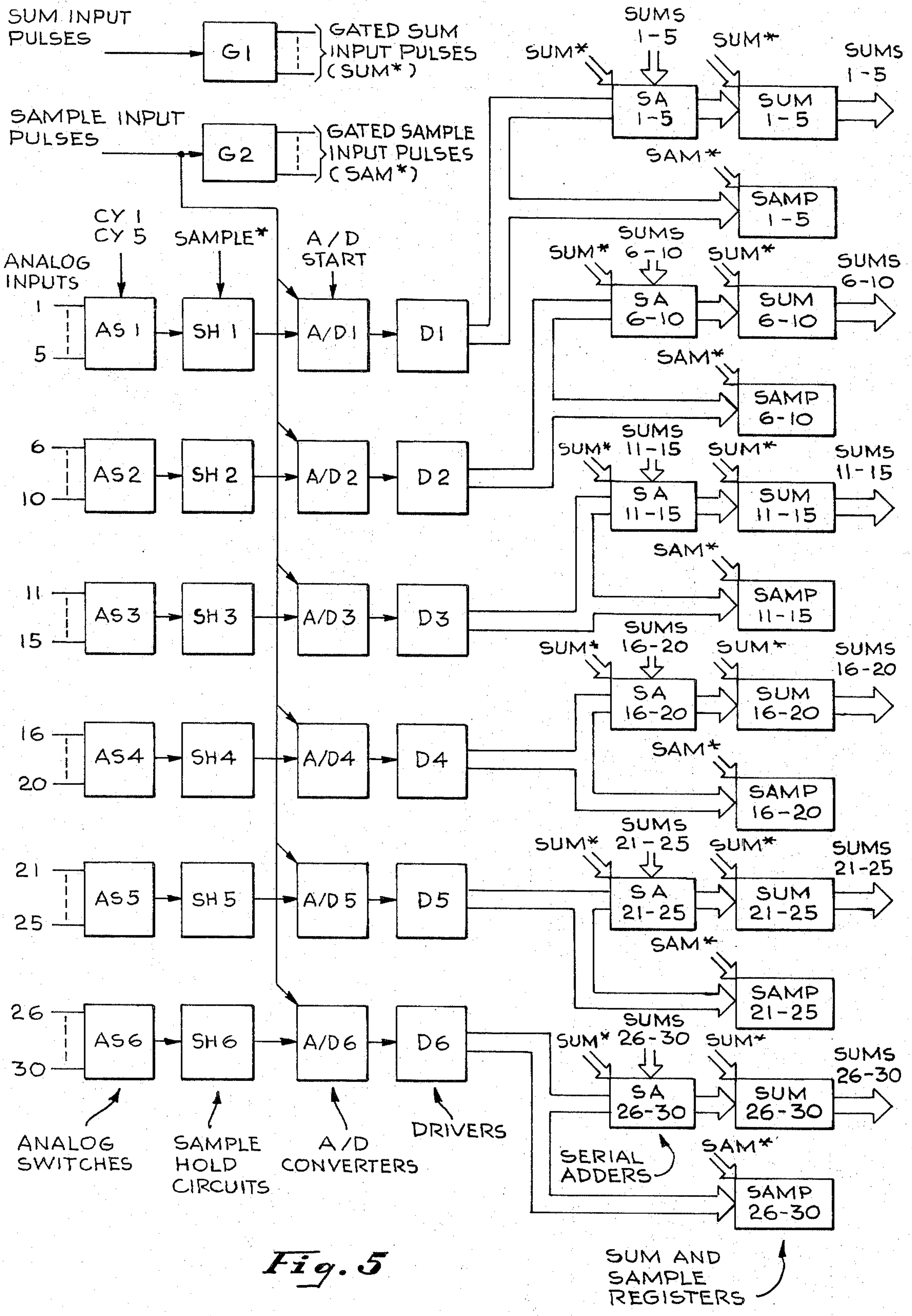
FIG. 5 is a block diagram of the transmitter input mode logic.

Attention is now directed to FIGS. 5 and 6 which respectively illustrate a block diagram of the Input Mode logic and the Input Mode timing signals developed within the 820 count interval represented in FIG. 4. The Input Mode is divided into five identical cycles CY1–CY5. The sequence of operations during CY1 is as follows:

1. The CY1 control signals causes each of the six Analog Switches AS1–AS6 (FIG. 5) to connect the first of its five analog inputs to the associated Sample and Hold (S/H) circuit (i.e., channels 1, 6, 11, 16, 21, and 26 are presented to SH1–SH6 respectively).

2. The Sample pulse occurring at count 21 causes the six S/H circuits to obtain and present at their outputs samples of the analog signals present at their respective inputs at that instant.

3. The A/D Start pulse occurring at count 51 causes the six analog to digital converters A/D1–A/D6 to begin converting the analog samples at their inputs into 8-bit binary numbers. This process is completed by count 151 (10 microseconds later). 4. The six 8-bit pulse codes are serially shifted from the A/D converters through drivers D1–D6 to the appropriate Sample Reigsters 1–30 (as specified by the CY1 signal) during counts 152–159. The sample bits are output in the sequence shown below:

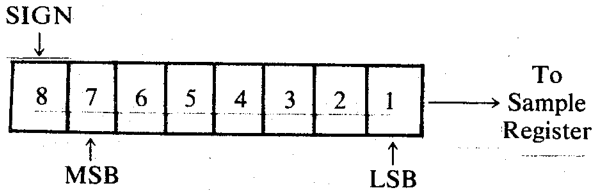

5. Counts 152–158 and 160–164 are applied to the six Serial Adder circuits SA1–SA30 and Sum registers 1–30 corresponding to the channels currently being sampled (as determined by CY1). Samples bits 1 through 7 are added to sum bits 1 through 7 during counts 152–158. Count 159, which clocks the sign bits into the Sample registers, is not applied to the serial adder circuits and Sum registers since only the magnitude of the samples is used in computing activity status. Counts 160–164 restore the new sums to the proper positions in the 12-stage Sum registers and accomplish required carry additions. A maximum count of $(2^7 - 1) \times 30 = 3810$ is possible in adding the 7-bit sample magnitudes from thirty frames and therefore 12-bit Sum registers are required.

Events within Input Mode cycles CY2–CY5 occur with the same relative timing as the events in CY1. During CY2 the second group of six channels is sampled and input (i.e., channels 2, 7, 12, 17, 22, and 27); during CY3 the third group is input; and so forth until samples from all 30 channels have been obtained. At the completion of the Input Mode, a new sample has been stored in each of the thirty sample registers and the magnitude of each sample has been added to the 30-frame total accumulating in the associated Sum register.

FIG. 7 — TRANSMITTER ACTIVITY UPDATE MODE LOGIC

Figure 7:
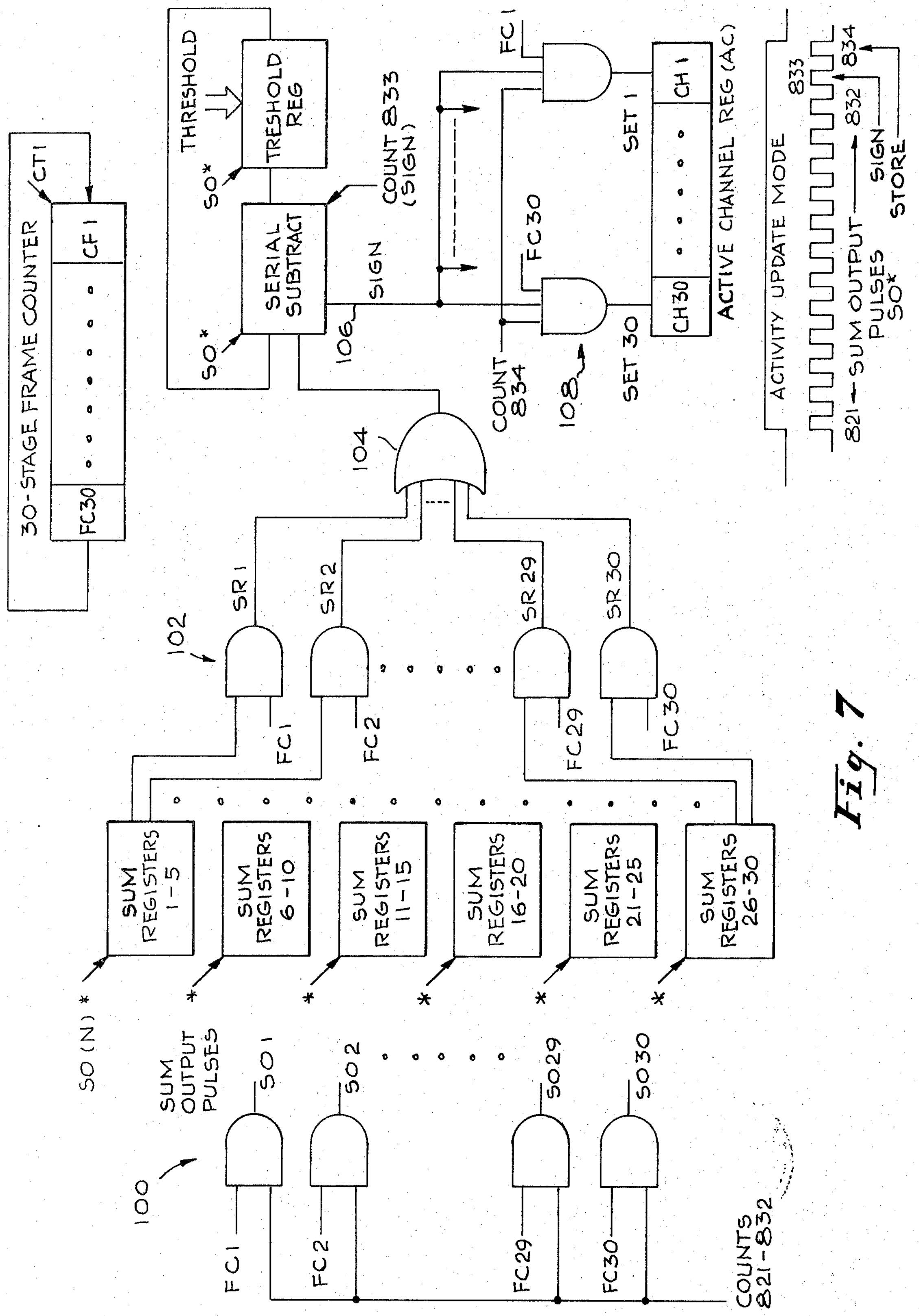
FIG. 7 is a block diagram illustrating the transmitter activity update mode logic.

From FIG. 4, it will be recalled that a frame pulse CT1 is generated at the beginning of each frame. As shown in FIG. 7, the frame pulse CT1 is applied to the shift input terminal of a thirty stage reentrant shift register constituting a frame counter (FC). The frame counter contains a 1 in one of its 30 stages. In response to each frame pulse CT1, the 1 bit is shifted one stage to the left to thereby successively define frame counts FC1–FC30.

The counts 821–832 are used in the Activity Update Mode to subtract the sum accumulated in one of the sum registers during the input mode from a pre-set threshold (either fixed or variable) stored in the threshold register. More particularly, the frame count output of the frame counter enables one of the AND gates 100 to output pulses during counts 821–832. The pulses output from the enabled gate 100 are applied to the shift input terminal of a corresponding one of the sum registers shown in FIG. 7 and previously referred to in FIG. 5. As a consequence, the sum accumulated in the selected sum register during the Input mode is shifted out through the particular one of the 30 AND gates 102 enabled by the output of the frame counter. The outputs of gates 102 are applied to the data input terminal of the serial subtract circuit through OR gate 104. Concurrently, the sum being entered into the serial subtract circuit is subtracted from the threshold stored in the threshold register. During count 833, following the last count of the subtraction operation, a "carry output" will be developed on serial subtract output terminal 106 if the sum entered into the serial subtract circuit exceeded the threshold. Thus, the carry output developed on terminal 106 means that the voice channel corresponding to the frame count is active. This active status is gated by the frame count through the enabled one of the 30 gates 108 to either set or clear the corresponding stage of the active channel register (AC).

FIG. 8 — TRANSMITTER SEGMENTATION MODE LOGIC

FIG. 9 — TRANSMITTER SEGMENTATION MODE TIMING

It will be recalled that the Segmentation Mode is comprised of the 54 counts 835–888. During the first 30 counts 835–864, the 30-stage Active Channel register and the 30-stage Frame Counter are simultaneously circulated and the following three functions are performed:

1. The total number of "ones" in the Active Channel register is counted by the 5-stage Active Channel (A) counter via gate 112. 2. The number of active channels "after" the current frame count is counted by the 5-stage A' counter via gate 114. The current frame count is indicated by the position of a single "one" in the Frame Counter (FC). The Frame Counter is circulated left one stage by frame pulse CT1 at the beginning of each frame to advance the frame count. During the Segmentation Mode, the frame counter is circulated right one stage on each of the 30 counts between counts 835 and 864 (hereinafter designated C30).

When the single "one" in the Frame Counter reaches the right end stage, the A' flip flop is set, allowing the A' counter to count the remaining "ones" in the Active Channel register. The A' flip-flop is clocked to receive data by pulses C30 via gate 116 only as long as the flip-flop is reset.

3. The activity status of the channel just updated is selected by the Frame Counter output and is gated to the appropriate Output Register via gates 120 and 122 by the Even Frame and Odd Frame Signals. The updated activity status is stored in stages 3–5 of the selected Output Register.

During counts 865–867, control signal (8A–92) is high. This signal causes the Subtract Input Gating circuit to present the sum in the 5-stage A counter (i.e. number of active channels as minuend to stages 8–4 of the nine-stage Parallel Subtract circuit. This effectively gives the minuend the value 8A. The same control signal (8A–92) causes the Subtract Input Gating circuit to present the hard-wired number 92 as a subtrahend to the Parallel Subtract circuit. The different (8A–92) is stored in the 9-stage Remainder (R) register at count 866.

If the difference 8A–92 is negative or zero, it indicates that the 92-bit sample field is large enough to contain the 8-bit samples from all channels currently active; and the sign output of the R register will be high. If the difference 8A–92 is positive, it indicates that the 8-bit samples from the channels currently active will not fit in the 92-bit field; and the sign output of the R register will be low. In this case the 3-stage Bits Removed Counter (BR) is incremented from zero to one at count 867.

Control level (R–A) is high during the fifteen counts 868–882. The transmitter computes the ratio $92/A = Q + R$ during this processing period if an overflow occurred ($8A > 92$). Control level (R–A) causes the Subtract Input Gating to connect the number stored in the R register as minuend to stages 5–1 of the Subtract circuit; and the A count to the corresponding stages as subtrahend.

Between zero and five (R–A) subtractions are performed between counts 868 and 882, depending on the values in R and A after the (8A–92) operation. If the value in R is negative or zero, no (R–A) subtractions are performed. This corresponds to the normal case where the 8-bit samples from all of the active channels "fit" within the sample field. If the result of (8A–92) is positive, A is subtracted from R at count 869. If the result is still positive, the BR counter is incremented from one to two at count 870 and a second (R—A) subtraction is enabled to occur at count 872; but if the result of the first (R—A) subtraction is negative or zero, the BR counter is left at a count of one and the remaining four (R—A) subtractions are inhibited. This corresponds to the case where the removal of one bit from each sample will enable the samples to fit in the 92-bit field (i.e., $Q = 7$). The subtractions (R—A) continue (and BR is incremented) in the same fashion until a negative result is obtained. At this point the count is the BR counter will be (8–Q), which is the number of bits that must be removed from the (A–R) channels that will be assigned slot length Q. The R register will contain a negative number whose magnitude is R, the number of channels that can be assigned (Q + 1) bits. The process just described effectively accomplished the division 92/A = $Q + R$ by the method of repeated subtraction.

Control signal (A'–$R_{TC}$) is high during the six counts 883–888. During this processing period the transmitter allocates Q bits and (Q + 1) bits to the appropriate active channels if an overflow occurred ($8A > 92$). If no overflow occurred ($BR = 0$), these operations are not performed. When control signal (A'–$R_{TC}$) goes high the A' counter contains the (positive) number of active channels after the current frame count and the R register contains the (negative two's complement) number of channels that can be allotted (Q + 1) bits. Control signal (A'–$R_{TC}$) causes the Subtract Input Gating to connect to the Subtract circuit A' as minuend and the two's complement of the number in the R register ($R_{TC}$) as subtrahend. The result of the subtraction (A'–$R_{TC}$) is stored in the R register at count 884. If this result is negative, there are less active channels "after" the current frame count than there are "remainder bits" available to be assigned. In this case, the result of the subtraction is left intact in the R register to specify the number of active channels before the current frame count that can be assigned remainder bits. Flip flop $R_{TC}>A'$ is set at count 885 to indicate that all channels after the current frame count can be assigned remainder bits. If the result of the subtraction (A'–$R_{TC}$) is positive or zero, there are more active channels after the current frame count than remainder bits available (or an equal number). In this case the transmitter will subtract the R register contents from A' at count 887 thereby restoring the original number of remainder bits R (now positive) in the R register. This subtraction is enabled by control input 4 to the Subtract Input Gating circuit. The positive number R can be used to specify the number of active channels after the frame count that can be assigned remainder bits. It should be recalled that in the normal case where the samples fit in the 92-bit field, the calculations described above will not be accomplished and the R register count will be left at 8A–92.

An example will make the segmentation process described in the preceeding paragraphs less abstract. Assume that the current frame count is 10 and that at a particular sampling instant 14 of the 30 voice channels (1 and 3 through 15) are active (i.e. $A$=14). At count 866 the Parallel Subtract circuit would compute $8A$—92 = +20. Since the result is positive, the BR counter would be incremented from zero to one at count 867. At count 869 "A" (or 14) would be subtracted from the R register contents (20), producing a result of +6 in the R register. BR would be incremented again at count 870. At count 872 the difference R—A, now (6—14) = —8 would be computed. This —8 is R, i.e., the number of remainder bits that are available to be distributed among the 14 active channels. Subtracting the two's complement of R (8) from A'(5) would produce —3; since this is a negative number the $R_{TC}$>A' flip flop would be set and the number —3 would be left intact in the R register. This establishes the correct remainder bit distribution, namely all active channels after the current frame count 10 (i.e., 11 through 15) and the first 3 active channels before the current frame count 10 (i.e., channels 1, 3, and 4) receive (Q+1) bits.

To illustrate the second case (A' ≥ $R_{TC}$), assume that the frame count is 1 instead of 10. Then A' = 13 and A' – $R_{TC}$ = +5 (that is, there are five more active channels after the current frame count than there are available remainder bits). In this case, the transmitter goes on to compute $A' - (A' - R_{TC}) = 8$ at count 887; this is the number of channels after current frame count 1 that can be assigned remainder bits. Flip flop $R_{TC}>A'$ is not set in this case.

To summarize, one of three situations will exist at the completion of the segmentation process.

1. $BR = 0$. This is the most frequent case, where sufficiently few audio channels are active to permit 8 bits of the active channel sample field to be assigned to each active channel.

2. $BR = (8-Q)$, R register negative, $R_{TC}>A'$ flip flop set. This is the case where all active channels after the current frame count are to be assigned Q + 1 bits; and the R register magnitude specifies the number of active channels before the frame count that are to be assigned Q + 1 bits. (The A–R remaining active channels before the frame count are to be assigned Q bits.)

3. $BR = (8 - Q)$, R register positive or zero. In this case the first R register magnitude specifies the number of active channels after the frame count (and none before) to be assigned extra bits.

FIG. 10 (A and B) — TRANSMITTER OUTPUT MODE LOGIC

FIG. 11 — TRANSMITTER OUTPUT MODE TIMING

As will be recalled from FIG. 4, the Output Mode is comprised of the 362 counts 889–1250 of the frame interval. Of the 362 counts the first 270 are involved in the transfer of samples from the Sample Registers, referred to in FIG. 5, to the active one of the two Output Registers; and the last 92 counts function in "right justifying" the contents of the Output Register during non overflow frames.

The 270 counts 889–1,158 are comprised of 30 consectuve 9-count sample output cycles, one cycle for each of the 30 channels. The first 8 counts in each 9-count output cycle (the Output pulses) are available to shift data from the appropriate Sample Register into the active Output Register. The ninth count in each cycle (the Channel Advance pulse) advances the counters and registers that control the output process so as to initiate the next sample output cycle. It should be noted that the Sample Registers are emptied most significant bit first during the Output Mode, whereas they were filled least significant bit first during the Input Mode. Accordingly, the Sample Registers preferably comprise reversible shift registers.

The primary counters and registers involved in controlling the Output Mode are the folling (see FIG. 10A):

1. Active Channel (AC) Register. This is a 30-stage shift register, previously mentioned in FIG. 7, which contains the current activity status of each channel as computed during the Activity Update Mode. The Channel 1 activity status is initially in the right hand stage, where it is available at the AC output. The AC register is circulated right one stage by the ninth count in each sample output cycle (the Channel advance pulse). This causes the activity status of each channel in succession to be presented at the AC output.

2. Channel Counter (CC). This is a 30-stage ring counter which initially contains a "one" in the left hand stage (CH1) and zeros in the other 29 stages CH2–CH30. The CC is circulated right one stage on each Channel Advance (CA) pulse. This causes each of the channel outputs CH1–CH30 to go high in succession. Each channel output remains high for one sample output cycle (nine counts), the same cycle during which the activity status of that channel is available at the AC register output. The function of the Channel outputs is to select the one Sample Register to be output during each sample output cycle.

3. Frame Counter (FC). This is a 30-stage ring counter, previously mentioned in FIG. 7, which initially contains a single "one" in a position corresponding to the current frame count. At the beginning of each new frame, the Frame Counter is circulated left one stage by the frame pulse (FIG. 4) to advance the frame count. During the Output Mode, the FC is circulated right one stage on each CA pulse. The right hand stage (FC output) of the Frame Counter is sampled on each CA pulse by the A' flip flop. When the "one" in the Frame Counter reaches the end stage, the A' flip flop is set to indicate to the Output Mode logic that the remaining channels are "after" the current frame count. The A' flip flop controls the allocation of remainder bits to the active channels during overflow frames.

4. Bits Removed (BR) and BR' Counters. BR is a 3-stage incrementing counter which contains (8–Q), the maximum number of bits which must be removed from the samples currently active to fit them in the 92-bit Sample Field. At pulse count 889 defining the beginning of the Output Mode and on each CA pulse, the number in BR is dumped into BR', a 3-stage decrementing counter, BR' is then decremented from 8–Q to zero during the first (8–Q) clock pulses of each sample output cycle. The outputs $BR' = 0$ and $BR' = 1$ gate the output pulses to establish Q-bit and (Q+1)-bit slot lengths, respectively.

5. Remainder Register (R). The number stored in this 9-stage register at the beginning of the Output Mode depends on the outcome of the Segmentation Mode as previously described. The R register is used in conjunction with the Subtract Input and Parallel Subtract circuits as an incrementing or decrementing counter during the Output Mode. During overflow frames, the R register count is used in controlling the allocation of remainder bits to the active channels. During non-overflow frames, the R register count enables the transmitter to right justify the samples in the 92-stage Output register after all thirty sample output cycles have been completed. The Subtract Input circuit supplies the number R as minuend to the Parallel Subtract circuit throughout the Output Mode. During overflow frames either control input $R_{TC}>A'$ or $R_{TC} \leq A'$ will be high as a consequence of the segmentation mode. Input $R_{TC}>A'$ causes the Subtract Input circuit to provide a hardwired (−1) as subtrahend to the Parallel Substract circuit; input $R_{TC} \leq A'$ supplies a hardwired (+1). A "Clock R" pulse is supplied to the Parallel Subtract circuit whenever a remainder bit is output. This pulse causes the difference $R - (-1)$ or $-(+1)$ to be stored in the R register. Thus the Clock R pulses increment R towards zero (when it is negative) or decrement R towards zero (when it is positive) to keep a tally of the number of channels still to be assigned remainder bits. A hardwired (−1) is also presented as subtrahend to the Parallel Subtract circuit during the 92-count Scale Shift cycle of non-overflow frames. The first (8A–92) Scale Shift pulses increment the R register from (8A–92) to zero. The signal R $\neq$ 0 controls the application of the scale shift pulses to the Output register so that only 8A–92 right shifts are performed.

Figure 11:
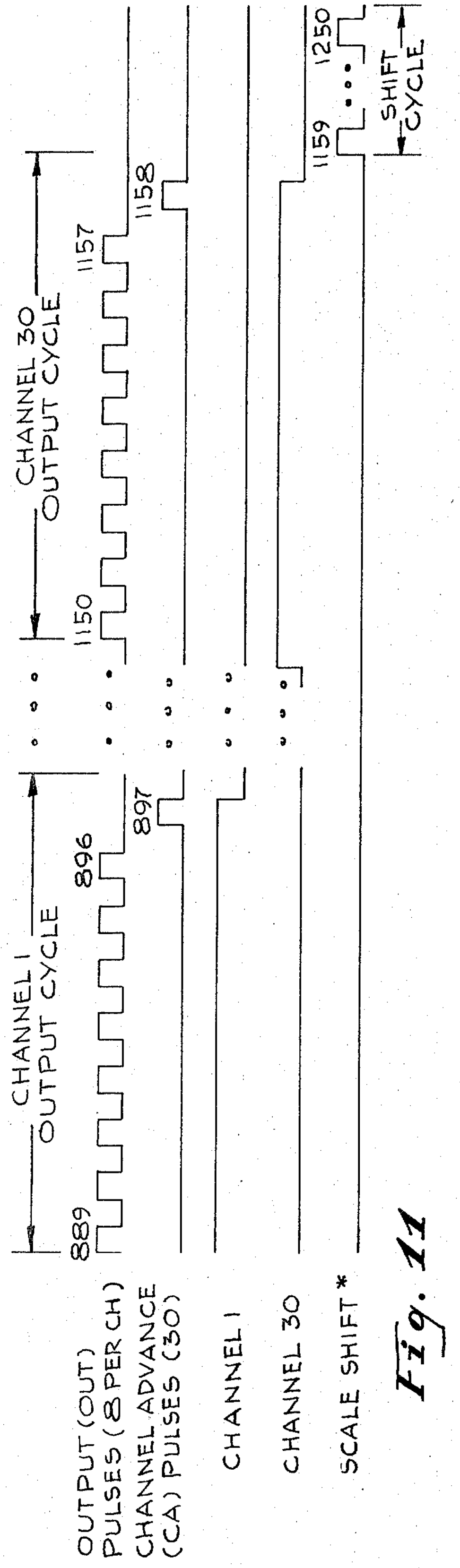
FIG. 11 is a timing diagram illustrating the transmitter output mode timing.
Figure 9:
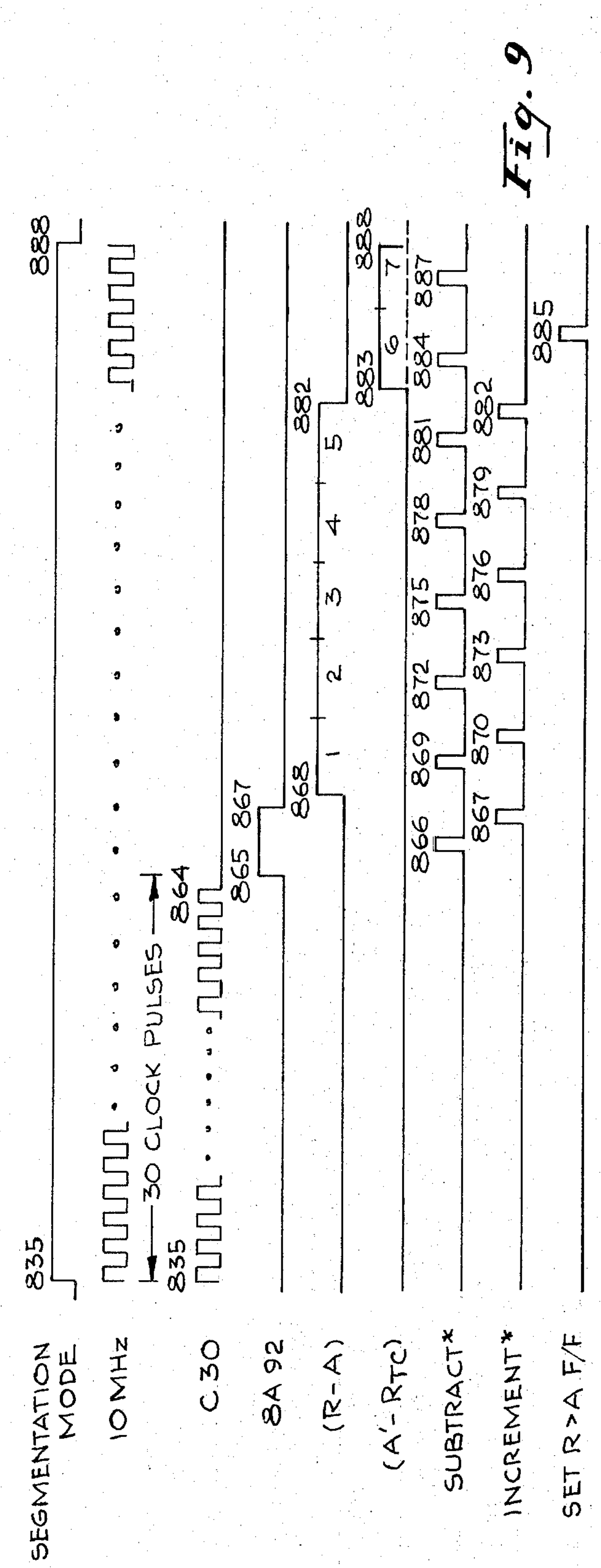
FIG. 9 is a timing diagram illustrating the transmitter segmentation mode timing.
Figure 10A:
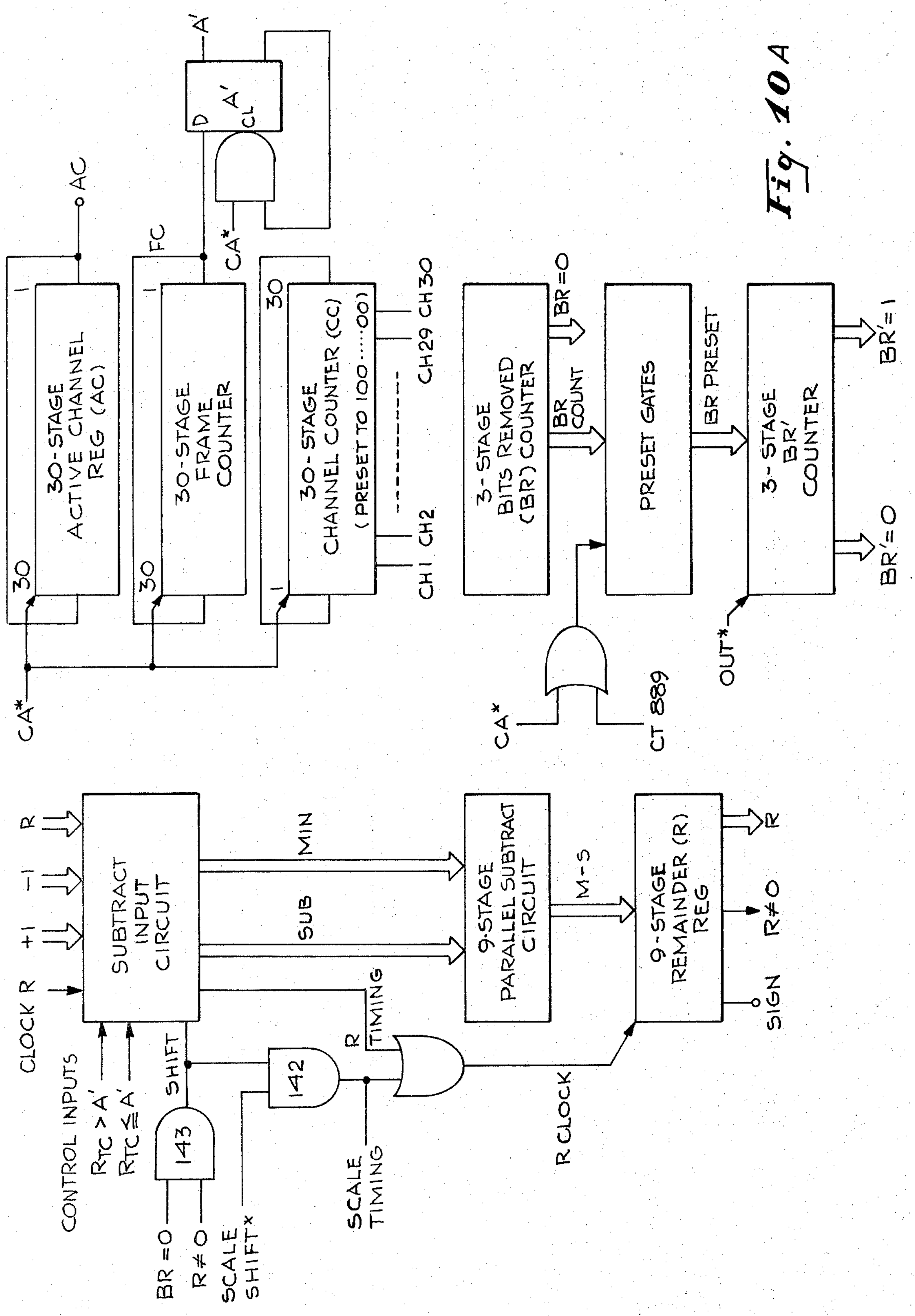
FIG. 10 (A and B) is a block diagram illustrating the transmitter output mode logic.
Figure 10B:
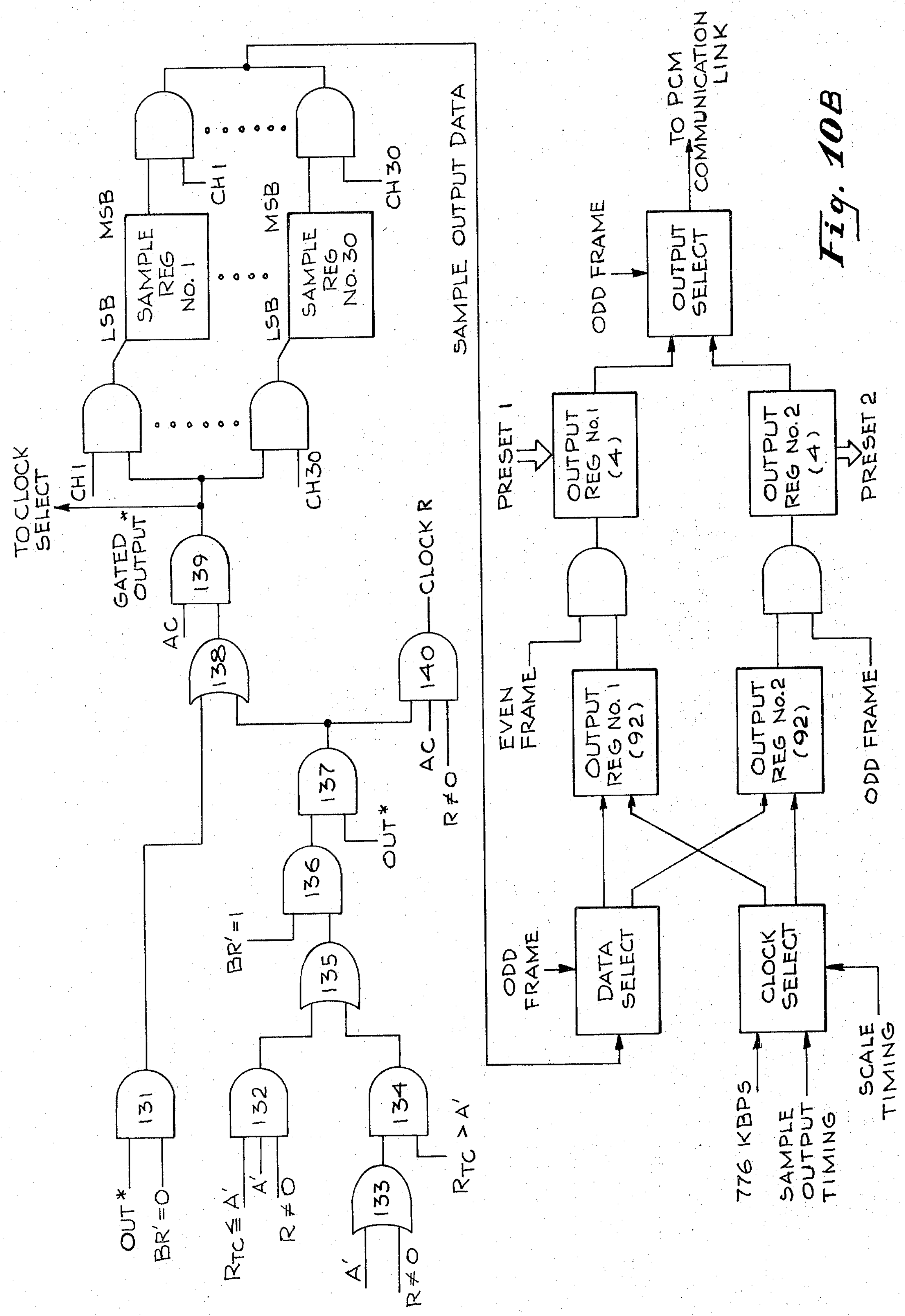

The aforedescribed registers and counters in FIG. 10A effectively modulate the Output pulse sequence of FIG. 11 based on their content at the completion of the Segmentation Mode so as to gate the proper number of pulses to the Sample and Output registers during each sample output cycle. A unique sequence of gated Output pulses is generated for each channel by gates 131–140 in FIG. 10B. The unmodulated pulse sequence is presented simultaneously to gates 131 and 137 and the modulated sequence is output to the Sample registers and the Output register from gate 139. There are four possible output sequences for a channel depending on whether 8 bits, no bits, Q bits, or Q+1 bits are to be transmitted for that channel during a particular frame. The operation of gates 131–140 in generating each of these four sequences is described on the following page.

1. 8 Bits Output (Non-Overflow Frames). During non-overflow frames, the $BR' = 0$ input to gate 131 is high throughout the Output Mode. As a result the 8 Output pulses applied to gate 131 during each sample output cycle are transmitted to the input of gate 139. The AC input (i.e. output of the active channel receiver) to gate 139 is high during all active output cycles, so that 8 clock pulses are output from gate 139 during each active cycle. The 8 clock pulses are supplied via the Clock Select circuit to the appropriate one of the two Output registers and are gated by the high Channel Counter output to the appropriate Sample Register.
2. No Bits Output. During all "inactive" output cycles, the AC input to gate 139 is low. This prevents transmission of any clock pulses to the Sample or Output registers.
3. Q Bits Output (overflow Frames). The $BR' = 0$ input to gate 131 is low during the first 8–Q clock pulses of overflow frames, while BR' is counting down from 8–Q to zero. The remaining Q clock pulses are transmitted to gate 139 as described above. Because the first 8–Q pulses are inhibited, only the most significant Q bits of the sample are output.
4. Q + 1 Bits Output (Overflow Frames). There are three situations in which the Output pulses are enabled early, at $BR' = 1$, via gates 136 and 137. These situations are defined schematically by the logic of gates 132 through 135. Enabling the Output pulses at $BR' = 1$ allows a total of Q + 1 clock pulses to be output, thereby creating a Q + 1 bit slot. Each time a remainder bit is output in this way, the Clock R signal from gate 140 modifies the R register contents (via gates 142 and 143) so as to increment or decrement its stored tally.

The 92 Scale Shift pulses 1159–1250 are used to right justify the samples in the Output register during normal non-overflow frames. The Scale Shift pulses applied to the R register from gate 142 are simultaneously applied as decrement pulses (via Clock Select Circuit) to the Output register, which contains the 8A active sample bits, left justified. The R register contains an initial count of 8A–92 during non-overflow frames. After 8A–92 scale shift pulses the R register is decremented to zero, the samples are properly right justified in the Output register, and the Scale Shift pulses are shut off by the $R = 0$ input to gate 133. Count 1250 concludes the Output Mode and completes the transmitter's operation in constructing a typical Adaptive PCM frame. The constructed frame is subsequently shifted out from the output register in which it is stored to the communication link during the next frame period while a new frame is being constructed in the other output register. The bits are shifted out to the communication link at a 776 kilobit rate as shown in FIG. 4.

FIG. 12 — RECEIVER

FIG. 13 — RECEIVER TIMING

It will be recalled that the transmitter output mode logic (FIG. 10) applies a continuous 776 kilobit per second data stream to the PCM communication link which in turn is presented to the Receiver Input Registers shown at the left side of FIG. 4. From this data stream, the Receiver provides 30 reconstructed analog signals to the audio channels at the right side of FIG. 12.

Basic timing for the receiver is abstracted from the incoming signal by the Timing Extractor, which is tuned to detect the signal's 776 kilocycle component. The Timing Extractor outputs to the Frame Sync circuit a 776 kilocycle square wave with a high-to-low transition at the middle of each 1.3-microsecond bit time. The Frame Sync circuit uses the 776 kc signal to perform two functions: (1) to detect the frame sync pattern in the incoming data so as to "flip the switches" on the Input registers (IR1 or IR2) each time a complete frame is stored, and (2) to notify the Activity Sync logic when the activity sync bit in each incoming frame is available for sampling in the end stage of the Input register. The Activity Sync logic uses the sequence of frame and activity sync bits to control a modulo-30 Frame Counter. The current frame count is then supplied to the Activity Update logic where it defines the channel whose activity status is being updated during each frame. The Activity Update logic stores the current activity status of each of the 30 voice channels. This information together with the frame count enables the Segmentation and control logic to determine how the transmitter segmented the sample field of each frame, by simply duplicating the transmitter's calculations. The segmentation information is then supplied to the Output Control logic where it controls regeneration of the PCM samples and their successive output to the six digital to analog (D/A) converters.

Figure 3:
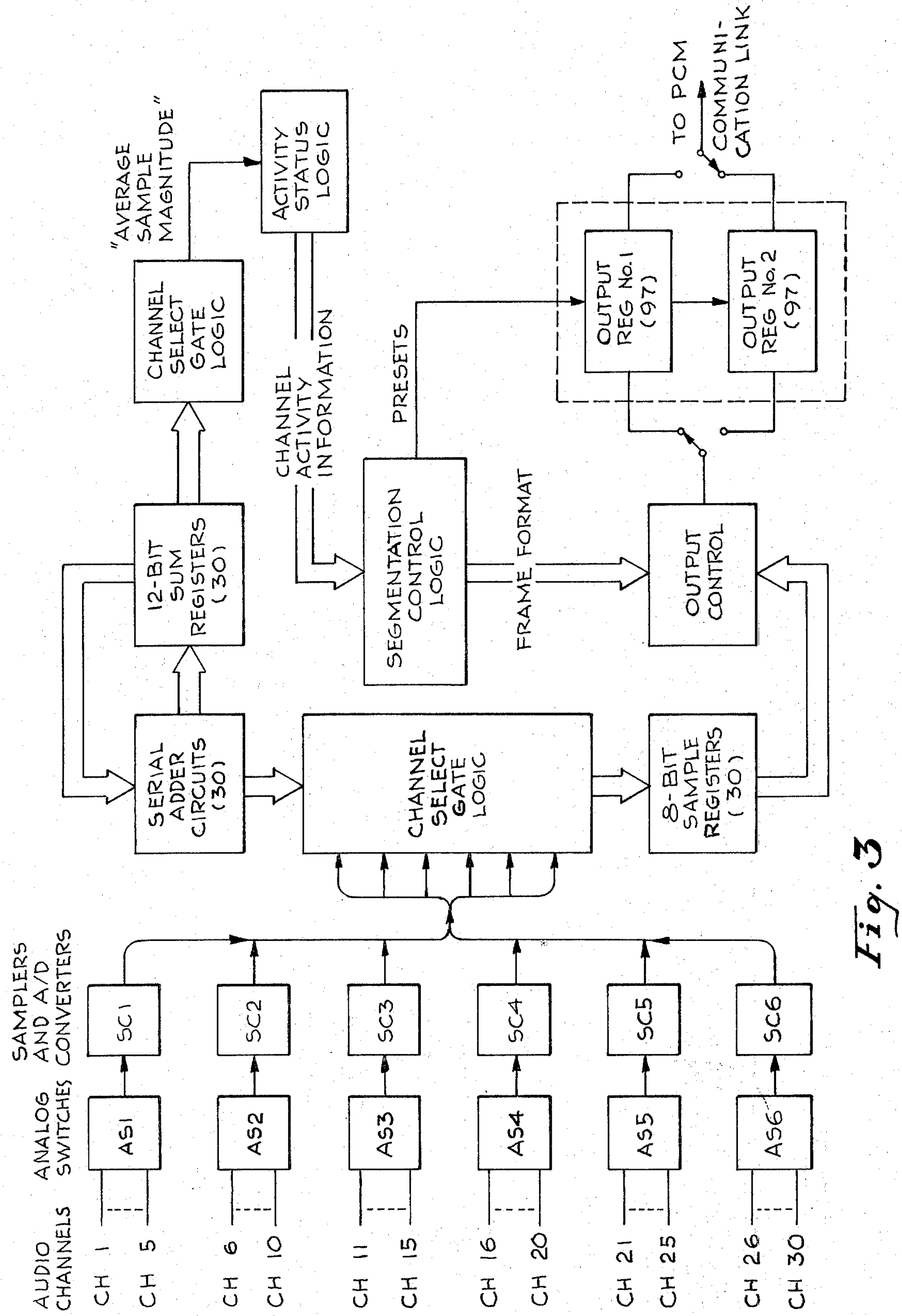
FIG. 3 is a block diagram of a transmitter in accordance with the present invention.

The analog outputs of the D/A converters D/A1–D/A6 are gated by the six Analog Switches AS1–AS6 to the 30 Sample/Hold circuits SH1–SH30. Each Sample/Hold (S/H) circuit stores the new analog sample corresponding to its channel at a specific instant during the frame. The outputs of the SH circuits after passing through low pass filters (LPF) are reconstructions of the audio signals originally input to the transmitter (FIG. 3). These signals are output to the individual user circuits.

Figure 13:
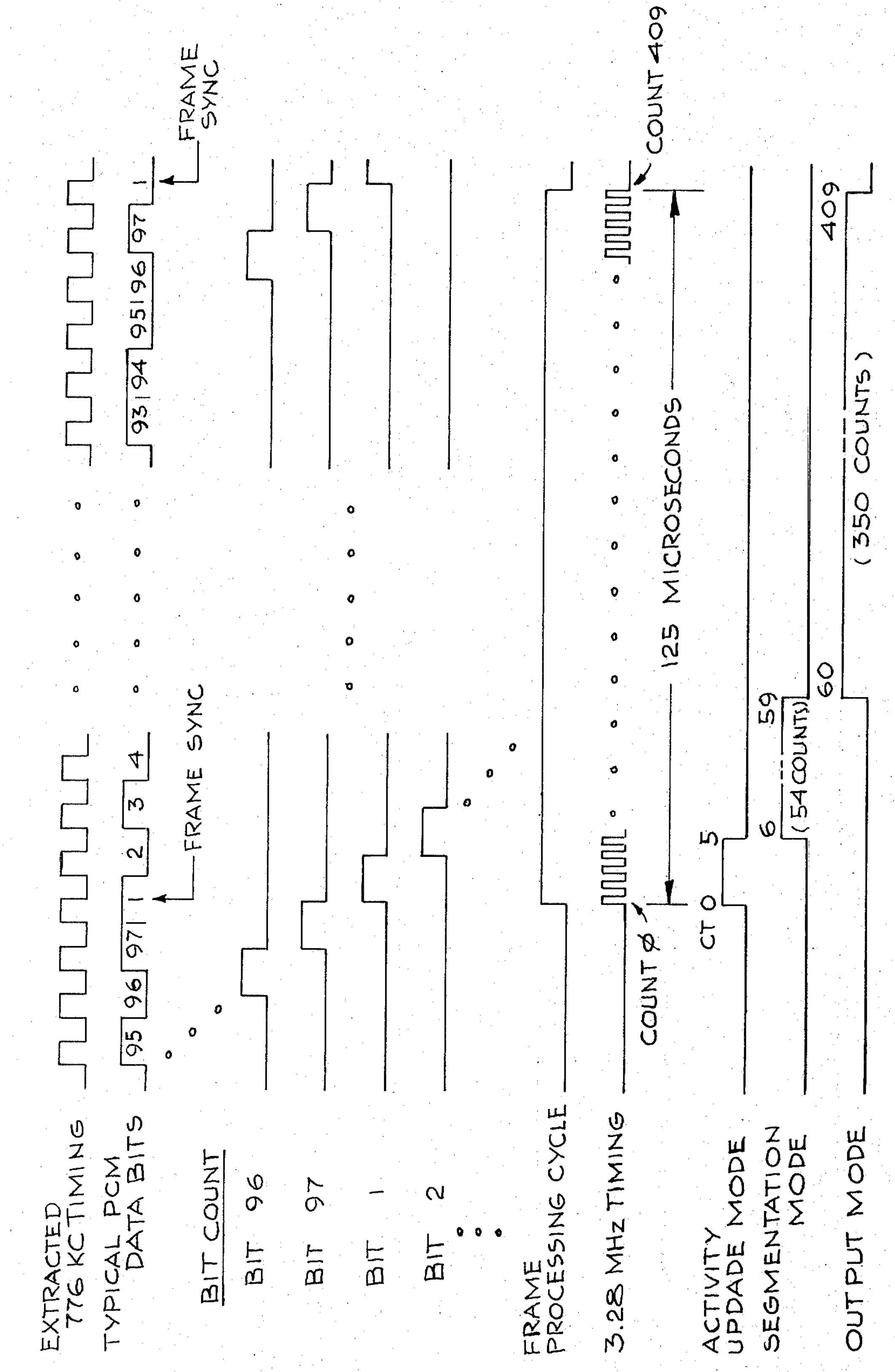
FIG. 13 is a timing diagram illustrating the receiver timing.

The five basic operations performed by the receiver (i.e. frame sync, activity sync, activity update, segmentation, and sample output) are represented in FIG. 13. Frame sync and activity sync are accomplished during the actual input of each frame from the communication link, whereas the three frame processing operations (activity update, segmentation, and sample output) are not begun until a complete frame has been stored in an Input register (IR1 or IR2). The frame and activity sync operations are controlled by the 776 kc timing derived from the incoming signal. The frame processing operations are controlled by a 3.28 MHz oscillator synchronized with the beginning of each input period which generates 410 counts in each 125-microsecond frame processing cycle. The 410 counts are allocated to three frame processing modes as illustrated in FIG. 13. The following paragraphs describe each of the receiver's five basic operations in more detail.

FIG. 14— RECEIVER FRAME SYNC AND INPUT LOGIC

Figure 12:
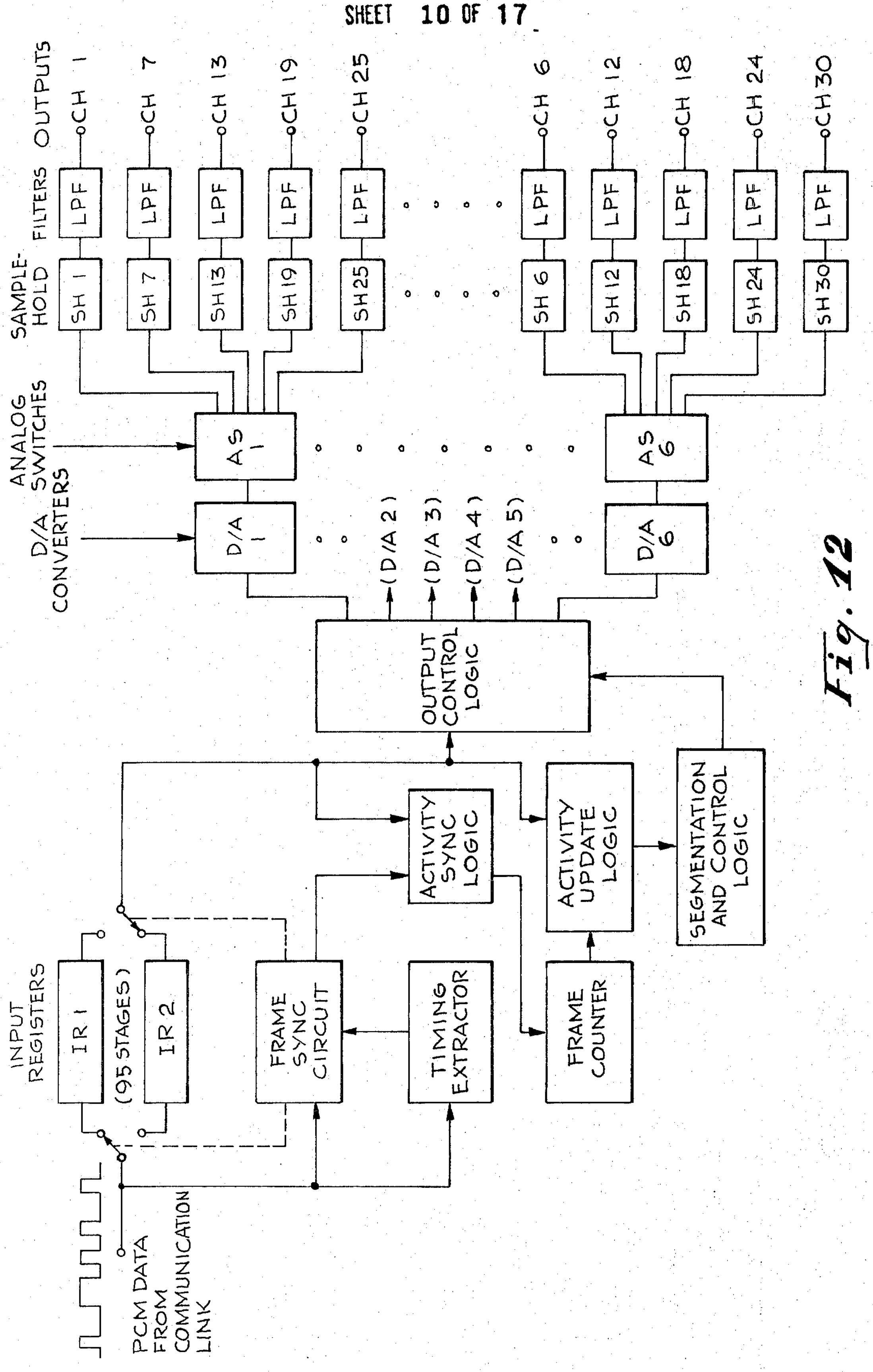
FIG. 12 is a block diagram of a receiver in accordance with the present invention.
Figure 14:
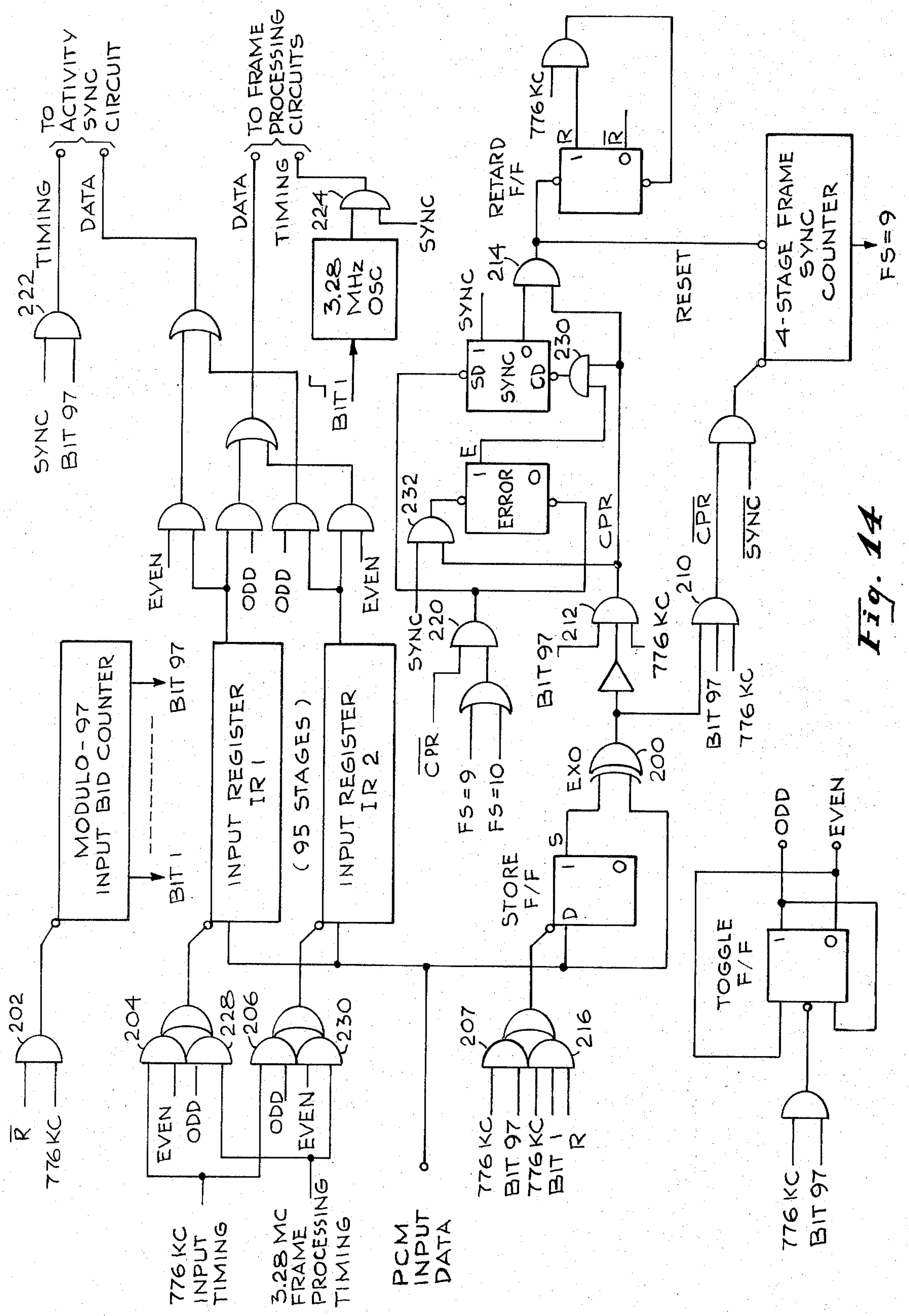
FIG. 14 is a block diagram illustrating the receiver frame sync and input logic.

The receiver frame sync and associated input logic, broadly represented in FIG. 12, is illustrated in greater detail in FIG. 14. These circuits receive two input signals: (1) the PCM input data from the communication link and (2) the derived 776 kc input bit timing. The frame sync and input circuits supply four output signals, namely data and timing signals to the Activity sync circuit and data and timing signals to the frame processing circuits. The frame sync and input logic circuits perform the functions of locating the alternating 1010 . . . frame sync bits in order to divide the continuous 776 kilobit input data stream into frames and storing these frames for processing. Once frame sync has been established, the previously mentioned 3.28 MHz clock signal (FIG. 13) is generated to define the 410 counts used in the frame processing cycle.

Primary elements of the frame sync and input logic are modulo-97 Input Bit counter, the two 95-bit Input registers, IR1 and IR2 shown in FIG. 12, a Store flip flop and Exclusive Or (EXO) gate 200, A Toggle flip flop, a 4-stage Frame Sync counter, a Sync flip flop, a Retard flip flop, and an Error flip flop. The Input Bit counter divides the incoming PCM data stream into successive 97-bit groups. The Input Bit counter is clocked by the derived 776 kc timing via gate 202 and functions to provide a Bit 1 and a Bit 97 output which respectively marks the assumed first and last bit in each 97-bit group. These Bit 1 and Bit 97 outputs are used in the search for the frame sync bits which procedes as follows.

PCM data from the communication link is presented simultaneously to the Input registers and to the Store flip flop. The 776 kc timing is gated to either Input register IR1 or IR2 dependent on the state of the Toggle flip flop which changes state in response to each Bit 97 output developed by the Input Bit Counter. The even and odd states alternately defined by the Toggle flip-flop respectively steer the incoming data bits via gates 204 and 206 into registers IR1 and IR2. The first bit in each 97-bit group is strobed into the Store flip flop by the gate 207 when the Bit 97 signal is generated by the Input Bit Counter. This stored bit is then compared with the first bit in the subsequent frame, 97 counts later, by the EXO gate 200 and gates 210 and 212.

If (during the first comparison) the stored bit is different from the corresponding bit in the preceeding frame (i.e., 01 or 10), the Compare Complement ($\overline{CPR}$) output of gate 210 is high, causing the 4-stage Frame Sync counter to be incremented from an initial count of zero to one. This records one "vote" for frame sync. At the same time as each "vote" is stored, the new input bit from the PCM data stream is strobed into the Store flip flop so that it can be compared again during the subsequent frame.

If the stored and received first bits are identical (00 or 11), the Compare (CPR) output of gate 212 is high, causing the Frame Sync counter to be reset to zero via gate 214. At the same time, the Retard flip flop is set. This inhibits the timing input to the Input Bit counter via gate 202 for one count and causes a new reference bit (the bit adjacent to the previous bit) to be strobed into the Store flip flop by gate 216. The sync circuit then proceeds to sample this adjacent bit position for the alternating . . . 1010 . . . sync pattern in the same manner.

Successive comparison of the first bits in each 97-bit group continues until some bit position is located in which the alternating frame sync pattern 101010 . . . continues for 10 successive frames. On the tenth successful comparison, when the Frame Sync output $FS =$ 9 is high, the Sync flip flop is set via gate 220. As a consequence the $\overline{SYNC}$ output goes low, disabling gate 214 and inhibiting the Frame sync counter from counting up further. At the same time, the high SYNC signal enables gates 222 and 224 to supply the timing outputs to the Activity Sync and Frame Processing circuits so that they can begin their respective functions. It is pointed out that gate 224 provides the frame processing timing to gates 228 and 230 respectively connected to the clock inputs of Input registers IR1 and IR2.

Gate 212 continues to monitor the frame sync pattern after sync has been achieved. If the stored and incoming frame sync bits are the same at any sampling time, the output of gate 212 goes high and the Error flip flop is set. The setting of the Error flip flop has no immedate effect on the Sync flip-flop. The Sync flip flop will be reset, via gate 230 only if the frame sync bit following the bit which set the prior flip flop also matches the preceding frame sync bit. If the proper frame sync pattern is re-established within two frames after an error, the Error flip flop is reset via gate 232 and the output of gate 214 remains low and no sync search is initiated. Otherwise the Sync flip flop is reset on the first frame after the error; and on the second frame after the error, the output of gate 214 goes high. This resets the Frame Sync counter and initiates a sync search as described above.

It should be noted that the Input registers IR1 and IR2 contain only 95 stages even though the frames are 97 bits in length. The first bit in each frame, the frame sync bit, is sampled by the Store flip flop on Bit 1 of the modulo-97 count and the second bit, the activity sync bit, is shifted out of the Input register to the Activity sync circuit on Bit 97. Thus at the completion of each 97 count input cycle the Input register just filled contains bits 3–97 of the frame, which are the activity status bits (3–5) and the 92-bit sample field.

FIGURE 15 — RECEIVER ACTIVITY SYNC LOGIC

Figure 15:
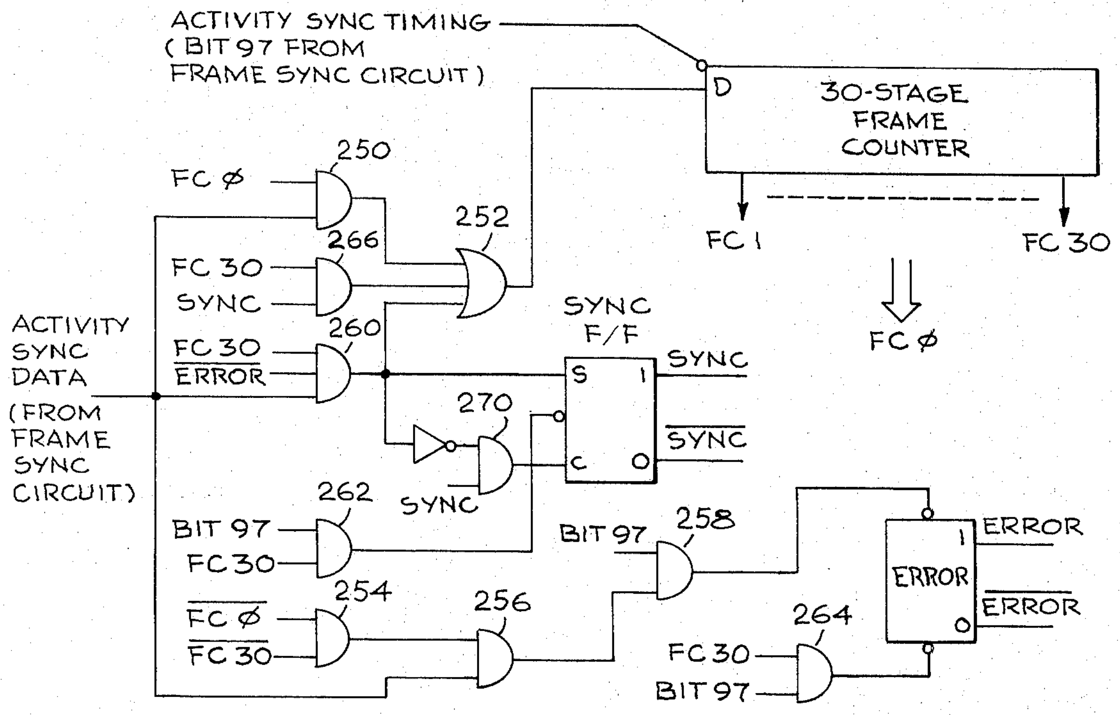
FIG. 15 is a block diagram illustrating the receiver activity sync logic.

FIG. 15 illustrates in greater detail the Activity Sync logic shown in FIG. 12. The Activity Sync logic receives a timing signal and a data signal from the frame sync and input circuits and supplies a frame count to the Activity Update logic. The function of the Activity Sync logic is to keep a current frame count based on the received activity sync pattern, which consists of . . . 1(29 0's) . . . etc. Detection of this pattern enables allocation of received activity status bits to the proper channels.

Primary components of the Activity Sync circuit, as shown in FIG. 15, are a 30 stage Frame Counter, a Sync flip flop, an Error flip flop, and 10 input control gates. The 30-stage Frame Counter is initially set to all zeros so that the FC0 input to gate 250 is high. The first time a "1" is present in the activity sync bit position of a received frame, it is coupled through gates 250 and 252 to the Frame Counter, where it is stored in the left hand stage by the Bit 97 timing signal. This causes output FC1 to go high while output FC0 goes high. On each of the next 29 timing pulses, the single "1" in the Frame Counter is shifted right one stage and the activity sync data on the input line is sampled, No "1s" should appear at the data input during these 29 counts because the activity sync pattern contains a "1" only every 30 frames. If a "1" does not appear, it is not gated into the Frame Counter but instead is coupled by gates 254, 252 and 258 to the Error flip flop, which it sets. If no "1s" appear during these 29 counts, the Error flip flop remains cleared. At the end of the twenty ninth count the single "1" in the Frame Counter is shifted into the right hand stage and the FC30 inputs to gate 260, 262, 264 and 266 is high. If the Error flip flop is cleared and the data is a "1" at FC 30, the output of gate 260 goes high to indicate that the activity sync pattern has been detected. The Bit 97 timing pulse then sets the Sync flip flop (via gate 262) and shifts a new "1" into the FC1 as the previous "1" is shifted out. This resets the frame count to one to initiate a new activity update cycle. The Bit 96 pulse also resets the Error flip flop (via gate 264) to enable it to monitor frames 1–29 during the next update cycle.

Once activity synchronization has been attained, the Activity Sync logic will accept a single error in the activity sync bit position without reinitiating a sync search. The output of gate 260 will be high at FC30 only if no errors occurred in the activity sync bit position during the last 30 frames; but the output of gate 266 will be high at FC30 whenever the Sync flip flop is set. When a single error occurs with the Sync flip flop set, the Frame Counter is reset to one at FC30 as usual via gate 266; bit at the same time the Sync flip flop is reset via gate 270. If no further errors occur during the next 30 frames, gate 260 will be high at the next FC30 and the Sync flip flop will be set again to re-establish normal in-sync operation. However, if another error does occur during the next 30 frames, both gates 260 and 266 will be low at FC30; in this case the Frame Counter is reset to zero. This enables gate 250 to initiate a new search. In this way the Activity Sync logic can maintain an accurate frame count in spite of random transmission errors.

FIG. 16 — ACTIVITY UPDATE MODE LOGIC

It will be recalled from FIG. 13 that the Activity Update Mode is the first of the receiver's three frame processing modes and occupies counts $\phi$ through 5 of the 3.28 Mc, 410-count frame processing cycle. The Activity Update logic receives as inputs the SHIFT & ADD and STORE timing signals, and supplies as output the current activity status of each channel. The activity status outputs are used by the Segmentation and Ouptut Control circuits.

Primary elements of the Activity Update logic are the two 95-stage Input registers IR1, IR2, a two-stage Activity Status (AS) counter, a Channel Select Matrix, and a 30-stage Active Channel (AC) register. At the beginning of the Activity Update Mode, activity status bits 3–5 of the 97-bit PCM frame are stored in the three right hand stages of the Input register just filled. Frame processing counts 1–3 shift these bits out of the Input register and at the same time the Activity Status Counter counts the number of "1's" in the three bit positions. If the number of "1's" in the three activity status bit positions is 2 or 3, the A output of gate 280 will be high to indicate to the Channel Select Matrix that the channel is active. Otherwise the $\overline{A}$ output of gate 280 will be high.

Only one of the 30 frame Counter inputs FC1–FC30 to the Channel Select Matrix will be high during each frame as determined by the current frame count. The Store pulse (count 5) is gated through the Channel Select matrix by the A, $\overline{A}$ and FC inputs to the Active Channel register, where it sets or clears the appropriate stage. This updates the activity status of the channel reported.

It will be recalled from FIG. 13 that the Segmentation Mode is executed during counts 6–59 of the receiver's 410-count frame processing cycle. The receiver's Segmentation logic is identical to that of the transmitter's Segmentation logic previously discussed in connection with FIG. 8.

FIG. 17 — RECEIVER OUTPUT MODE LOGIC

FIG. 18 — RECEIVER OUTPUT MODE TIMING

The receiver Output Mode is executed during the 350 counts 60–409 of the receiver's frame processing cycle. The 350 counts are comprised of 35 10-count output cycles. The first 30 output cycles correspond to Channel Counter outpus CH1–CH30 while the last 5 output cycles correspond to the Extra Cycle register outputs E1–E5. During a typical 10-count output cycle the first 8 counts (OUT* 1–8) function in transferring sample bits from the Input register just filled to a selected D/A converter; The ninth count (OUT* 9) functions in transferring a $2^{-1}$ (round off) bit into the selected D/A converter and initiates a sample pulse to a selected Sample/Hold circuit; and the tenth count (the Channel Advance or CA* pulse) advances the counters and registers which control the output process so as to initiate the next output cycle. The first five output cycles CH1–CH5 differ from this typical pattern in that no Sample pulses occur. The D/A converter outputs for Channels 1–5 are not sampled until cycles 6–11 respectively, so that the converters have 6 cycles or 19.3 microseconds to perform each conversion. The last five output cycles E1–E5 differ from the typical pattern in that no output pulses occur. These five extra cycles are required to complete output of samples 26–30 to the Sample/Hold circuits.

Primary elements of the Output Mode logic (FIG. 17) are the Active Channel (AC) register, Frame Counter (FC), and Channel Counter (CC); the Output Timing Control and Data Control circuits and Input registers; and the D/A converters, Analog Switches, and Sample/Hold circuits. The Active Channel register, Frame Counter, and Channel Counter perform exactly the same functions as these registers perform during the transmitter's Output Mode (FIG. 10). The receiver's Channel Counter has a 5-stage extension, the E register, which creates 5 extra output cycles.

Figure 20:
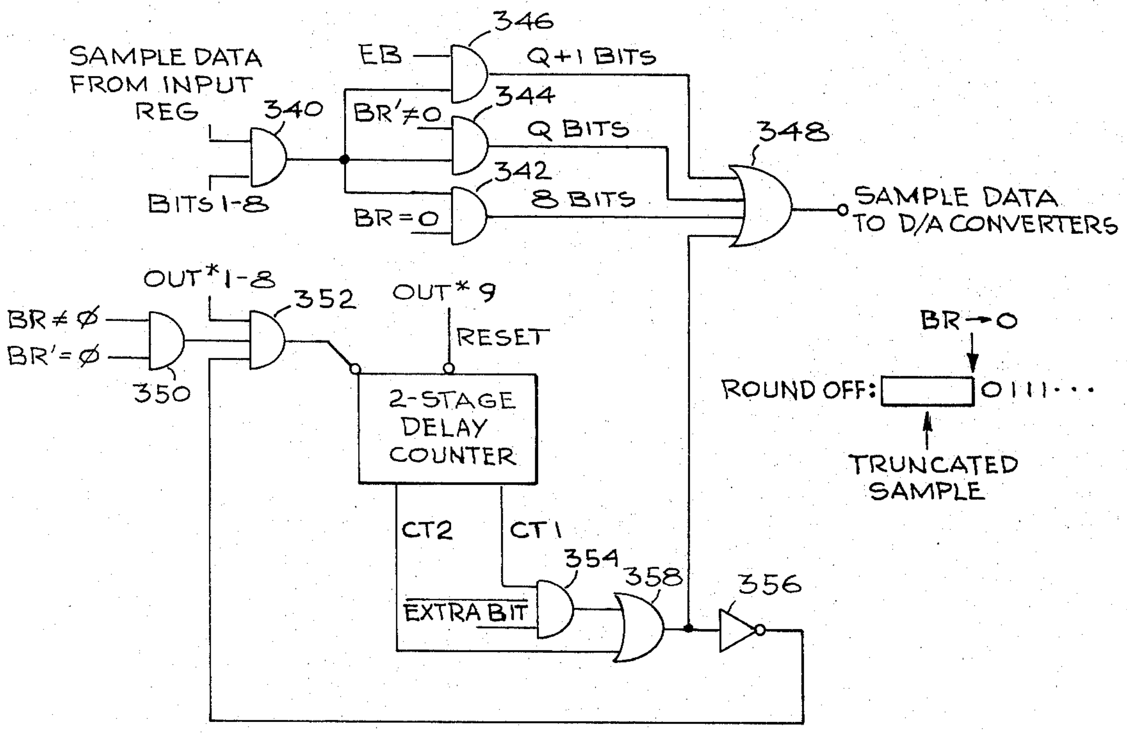
FIG. 20 is a block diagram illustrating the receiver output data control logic.
Figure 16:
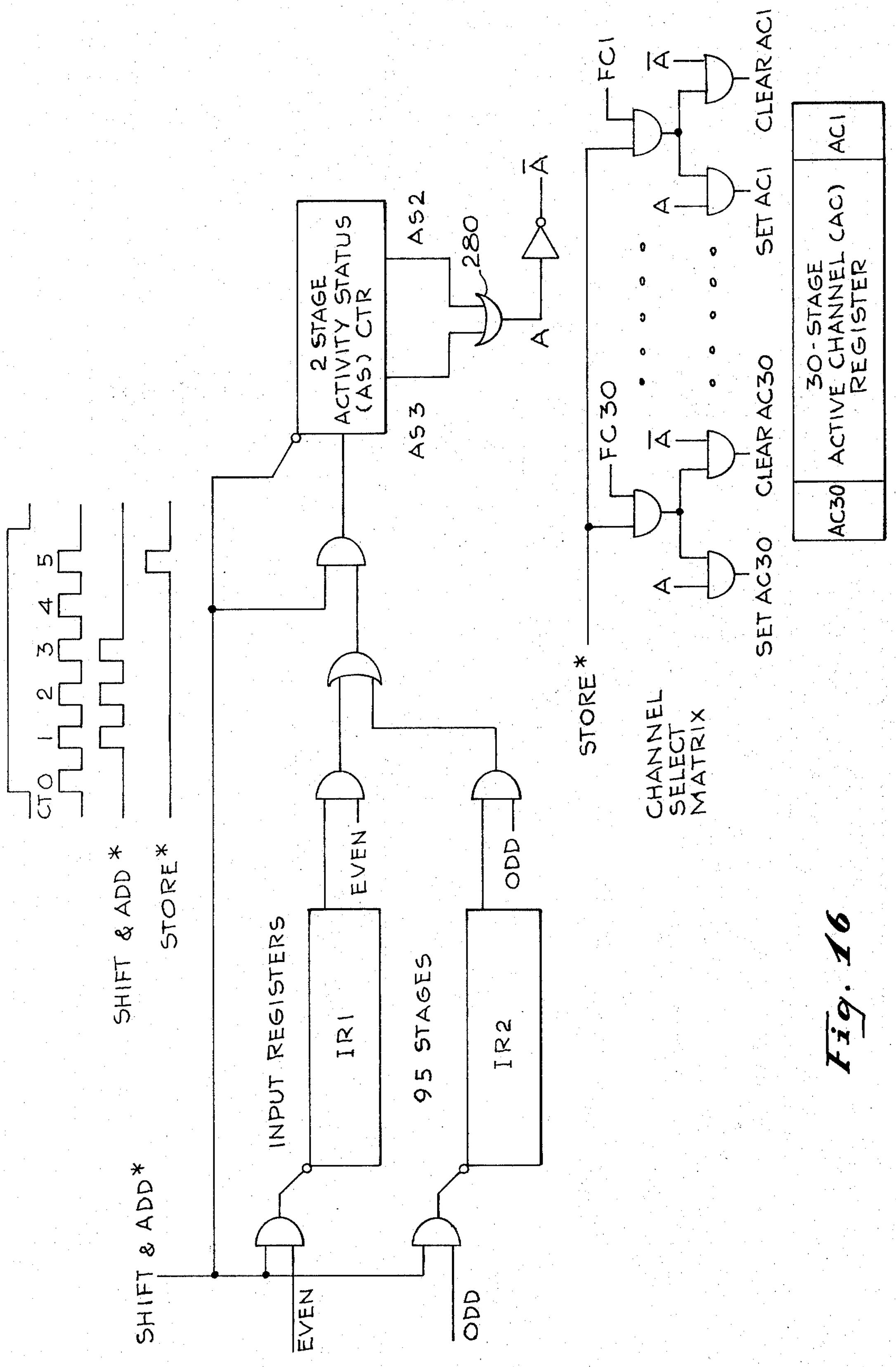
FIG. 16 is a block diagram illustrating the receiver activity update mode logic.

The Output Timing Control circuit modulates the OUT* 1–8 pulse sequence so that the appropriate number of sample bits (Q or Q+1) are clocked out of the selected Input register during each output cycle. The Data Control circuit inhibits the Input register output and supplies a 0111 . . . round off pattern to the D/A converters during overflow frames. The Output Timing Control and Data Control circuits are illustrated in FIGS. 19 and 20 and will be described hereinafter.

The samples are output from one of the Input registers to the D/A Converters, Analog Switches, and Sample Hold circuits on a round robin basis in order to provide as much time as possible for the relatively time-consuming D/A conversion process. During output cycle 1, the digital sample for Channel 1 is serially output to D/A Converter No. 1; during cycle 2, the sample for Channel 2 is output to D/A No. 2; and so on up to cycle 5. During cycle 6, the digital sample for Channel 6 is output to D/A No. 6; the analog output of D/A No. 1 is presented by AS 1 to S/H 1; and, at OUT* 9, this analog output is sampled by S/H 1. During cycle 7, the digital sample for Channel 7 is serially output to D/A converter No. 1; the analog output of D/A No. 2 is presented by AS2 to S/H 2; and, at OUT* 9, this analog output is sampled by SH2. The output sequence continues in this manner through cycle 30. During the five extra cycles E1–E5 samples from channels 26 through 30 are presented by AS2 through AS6 to S/H 26 through S/H 30, respectively. Each S/H circuit thus receives a new analog sample every 125 microseconds and holds this sample until the next Sample pulse is received. The filtered analog outputs of the Sample/Hold circuits duplicate the audio signals originally input to the transistor for all active channels. Zero volts appears at the S/H outputs of all channels not currently active.

FIG. 19 — RECEIVER OUTPUT TIMING CONTROL LOGIC

Figure 17:
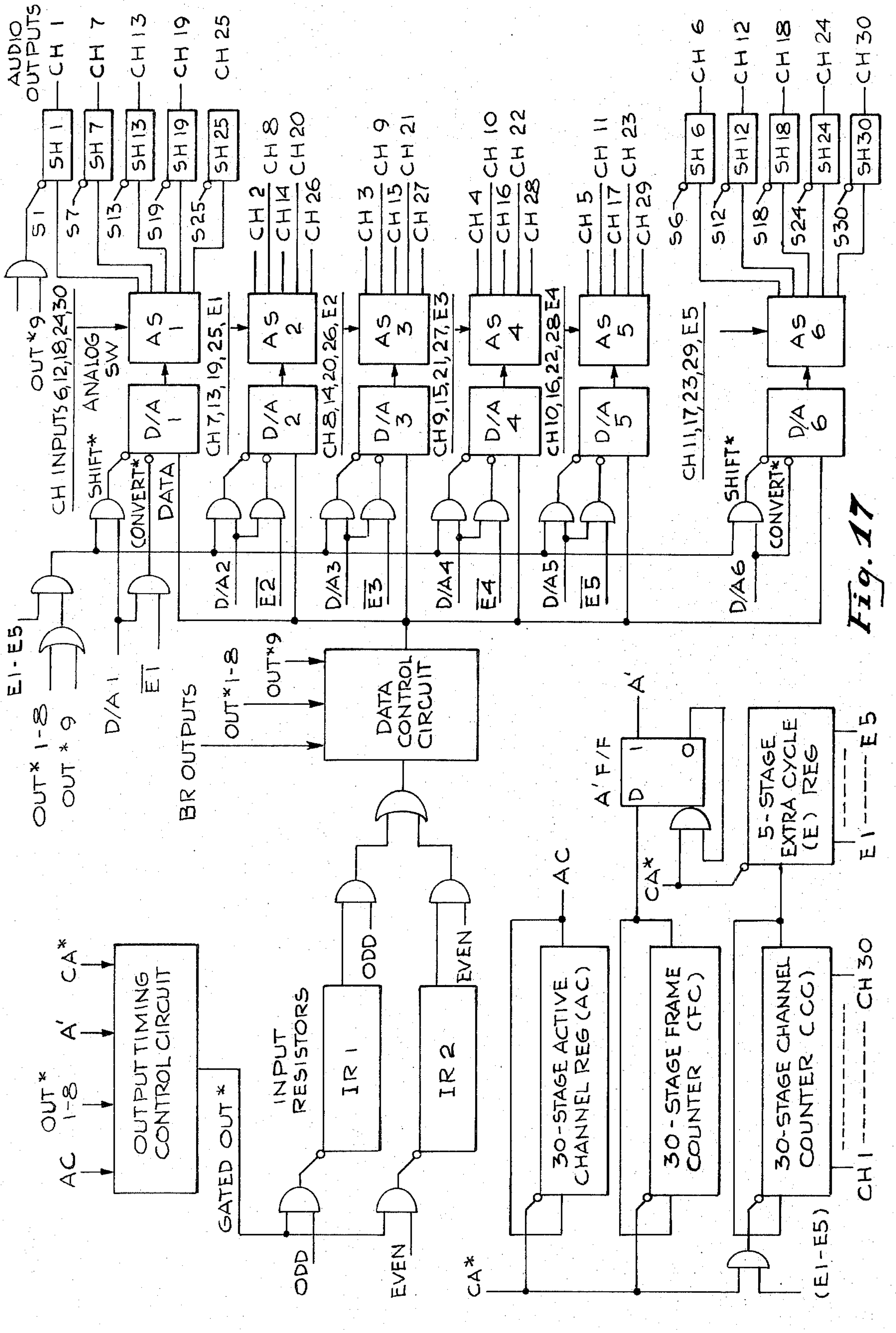
FIG. 17 is a block diagram illustrating the receiver output mode logic.
Figure 18:
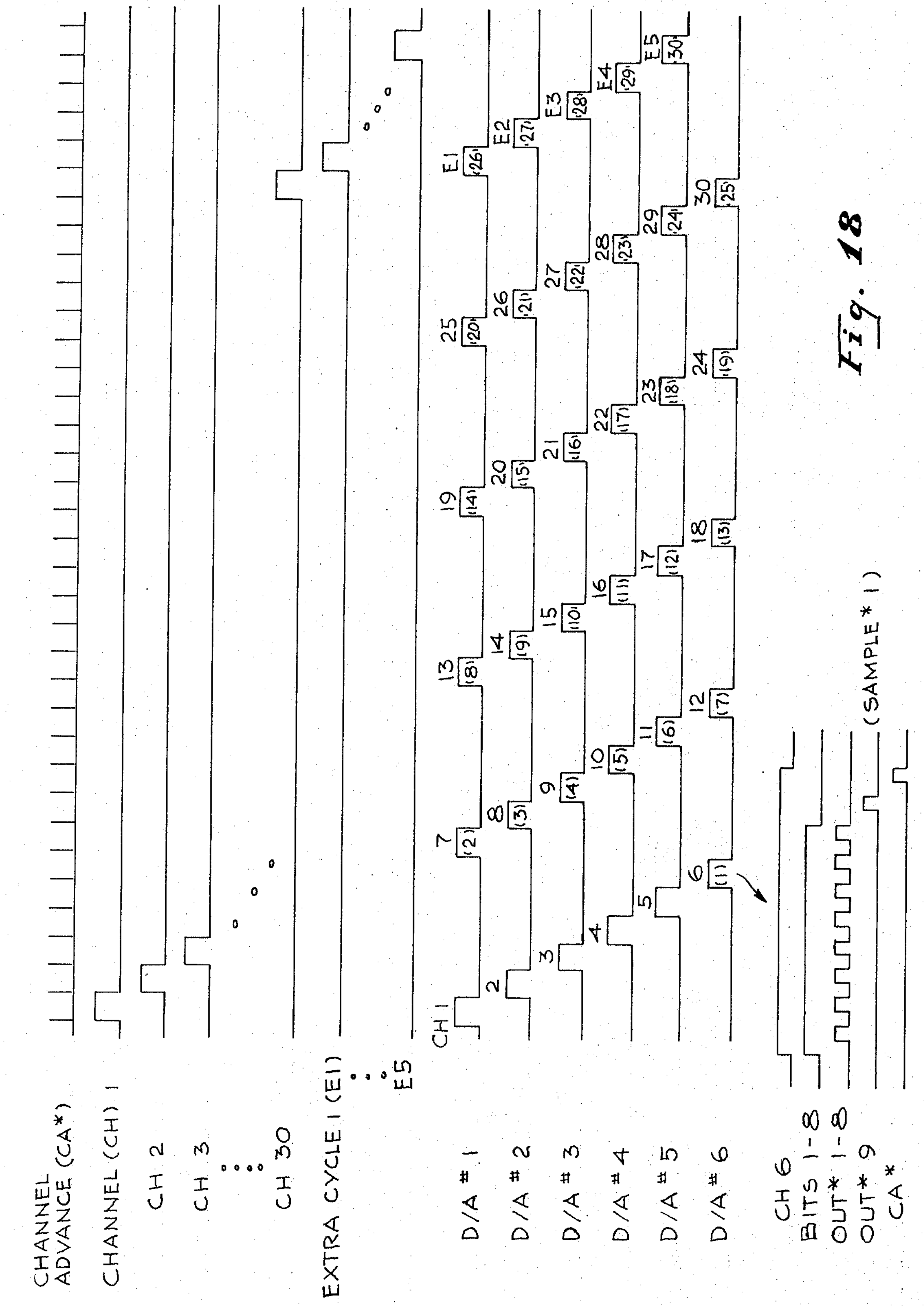
FIG. 18 is a timing diagram illustrating the receiver output mode timing.
Figure 19:
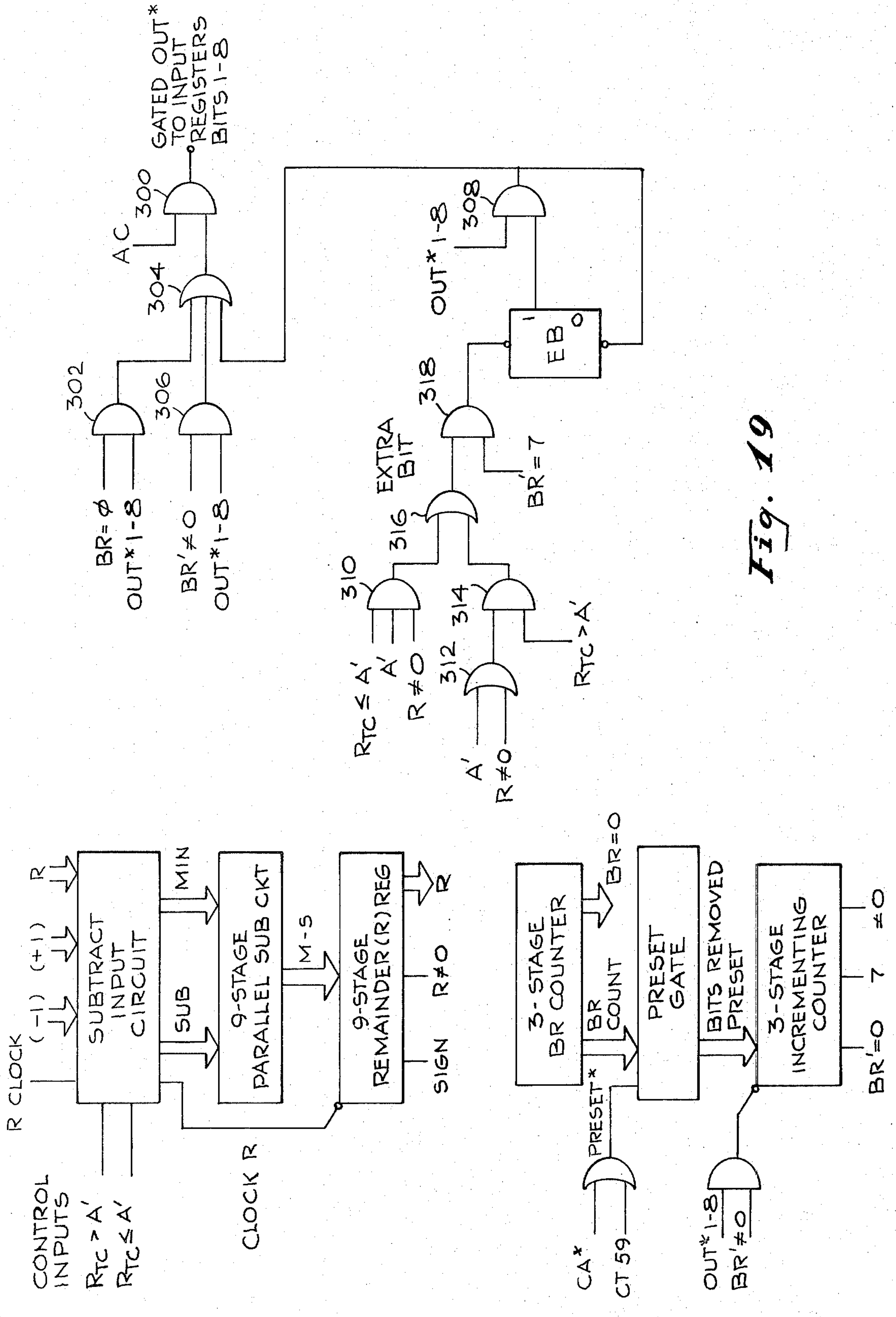
FIG. 19 is a block diagram illustrating the receiver output timing control logic.

The Output Timing Control logic, broadly illustrated in FIG. 17, is shown in greater detail in FIG. 19. During each output cycle (see FIG. 18), the Output Timing Control logic modulates the OUT* 1–8 timing so as to provide between 0 and 8 pulses to the Input registers of FIG. 17 dependent on the number of active channels and whether a particular channel should be allocated Q or (Q+1) bits. The exact number of such pulses supplied during each output cycle is determined by the outcome of the segmentation process.

Primary elements of the Output Timing Control logic are the Subtract Input circuit, 9-stage Parallel Subtract circuit, and 9-stage Remainder (R) register; the 3-stage BR counter and 3-stage BR′ counter, connected by Preset Gates; and an output gating network consisting of gates 300–320 and the flip flop labeled Extra Bit (EB).

Figure 8:
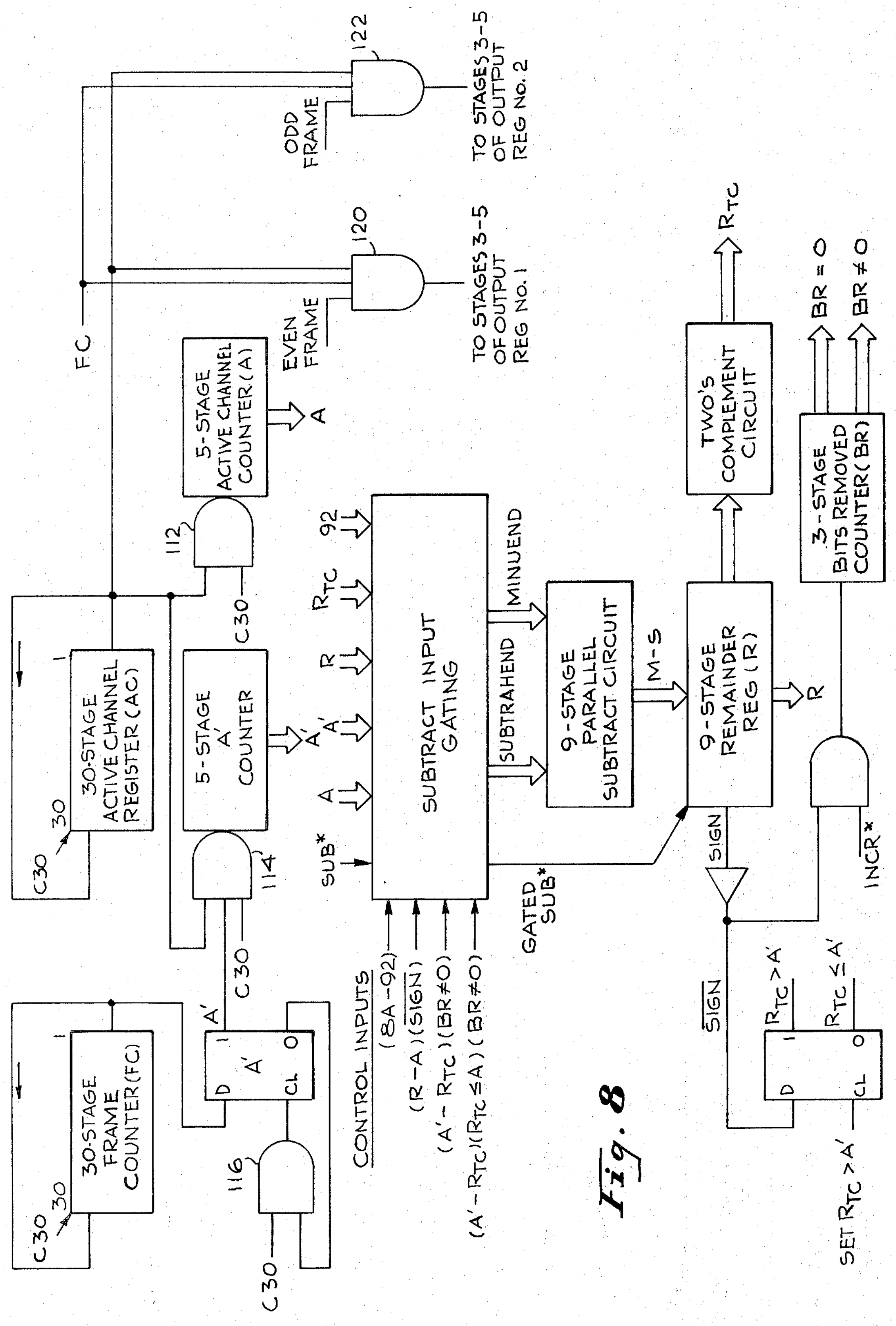
FIG. 8 is a block diagram illustrating the transmitter segmentation mode logic.

The Subtract Input circuit, Parallel Subtract circuit, and R register allocate extra bits to the proper active channels based on the segmentation outcome as described for the transmitter in connection with FIG. 8. The BR and BR′ counters and the preset Gates function in the same manner as corresponding elements in the transmitter, except that the BR′ counter in the receiver (FIG. 19) is an incrementing counter rather than a decrementing counter as in the transmitter (FIG. 10A). It will be recalled that the BR Counter stores (8–Q), the maximum number of bits which have been removed from each active channel sample to enable it to fit within the 92 bit Sample Field. Four possible output pulse sequences can be generated by the Output Timing Control logic (from output gate 300) during an output cycle, depending on whether 8 bits, no bits, Q bits, or Q + 1 bits are to be output from the Input register during that particular cycle. Operation of the output gating logic in generating each of these four sequences is described below:

1. 8 Bits Output (Non Overflow Frames). During non-overflow frames the $BR = 0$ input to gate 302 is high throughout the Output Mode. As a result the 8 output pulses applied to gate 302 are transmitted via gate 304 to the input of gate 300. The AC input to gate 300 is high during all "active channel" output cycles, so that all 8 clock pulses are supplied to the Input registers during these output cycles.

2. No Bits Output. During all "inactive" output cycles the AC input to gate 300 is low. This prevents transmission of any of the clock pulses OUT* 1–8 to the Input registers.

3. Q Bits Output (Overflow Frames). The BR′ ≠ 0 input to gate 306 is high only during the first Q clock pulses, while the BR′ counter is counting up from 8–Q to zero. Thus only the first Q clock pulses are transmitted through gate 306 to the Input registers. 4. Q + 1 Bits Output (Overflow frames). There are three situations in which an extra clock pulse is transmitted to the Input registers, via gate 308, one count after the BR′ counter goes to zero. These situations are defined schematically by the logic of gates 310, 312, 314, 316. When these conditions are met, the EB flip flop is set via gate 318 as BR′ goes to zero. The "1" output of flip flop EB gates the next output pulse to the Input Registers (via gate 308) and resets the EB flip flop.

FIG. 20 — RECEIVER OUTPUT DATA CONTROL LOGIC

The Data Control logic, broadly illustrated in FIG. 17, is shown in greater detail in FIG. 20. The Data Control logic receives as inputs the Sample Data from the enabled Input Register IR1 or IR2; the five control signals EB, $BR = 0$, $BR \neq 0$, $BR' = 0$ and BITS 1–8 (see FIG. 18) from the Output Timing Control circuit; and the timing signals OUT* 1–8 and OUT* 9. During each active output cycle the Data Control circuit supplies to a selected D/A converter nine data bits which comprise the digital sample for the appropriate channel.

Operation of the Data Control circuit differs during non-overflow and overflow frames. During non-overflow frames it is not necessary to round off the samples of the receiver since they were not truncated at the transmitter. In this case the Data Control circuit presents eight sample bits from the Input Register to the D/A converter coincident with pulses OUT* 1–8 and then presents a round off ($2^{-1}$) bit of "0" coincident with pulse OUT* 9.

During overflow frames, some or all of the active samples will have been truncated and hence round-off is required. In this case the Data Control circuit presents Q (or Q+1) sample bits from the Input register to the D/A converter during the first Q or (Q+1) output pulses; a "0" during the "next" output pulse; and 8–Q (or 7–Q) "1s" during the last 8–Q (or 7–Q) output pulses.

Primary elements of the Data Control circuit are a 2-stage delay counter and the control gates numbered 340–358. Sample data from the Input register is passed through gate 340 during the first eight clock pulses of each output cycle by the control signal BITS 1–8. The sample data is presented simultaneously to the inputs of gates 342, 344 and 346. During non overflow frames, the $BR = 0$ control input to gate 342 is high and as a result the sample data is presented (via gate 348)

to the D/A converter during all of the first eight output pulses. The BITS 1–8 signal is low during the ninth clock pulse so that $2^{-1}$ bit of "0" is output.

During the regeneration of samples truncated to Q bits, the BR' = 0 inputs to gates 344 and 350 are high for the first Q output pulses and are low for the remaining 9–Q pulses. Gate 344 supplies the sample data to the D/A converter during the first Q pulses while the BR' counter is incremented toward zero but disconnects the sample data from the converter during the last 9–Q pulses. The BR' = 0 input to gate 350 goes high after the Qth output pulse. This supplies a high input to gate 352, enabling the temaining OUT* 1–8 pulses to increment the two-stage Delay counter. On the first output pulse after BR' goes to zero (the Q + 1th pulse), gate 348 presents a "0" to the D/A converter since none of its four inputs is high. At the same time the Delay counter is incremented from zero to one. The Extra Bit input to gate 354 is high during Q-bit outputs so that during all of the subsequent 8–Q clock pulses, a "1" is presented to the D/A converter from gate 354. Inverter 356 inverts the roundoff output of gate 358 and supplies this inverted output as an inhibit signal to gate 352. This prevents the Delay counter from being incremented further once gate 358 has begun presenting the roundoff "1s" to the D/A converter. The Delay counter is reset at the end of each output cycle by OUT* 9 so that it can be used to control the data output during the next cycle.

As a result of the output process just described, a regenerated 9-bit sample consisting of Q transmitted bits, a "0", and 8–Q "1s" is presented to the D/A converter.

Regeneration of samples truncated to Q+1 bits differs from the regeneration of Q-bit samples in two respects. First, the EB input to gate 346 is high during the (Q+1)th output pulse so that one extra bit from the Input register is supplied to the D/A converter. Second, the Extra Bit input to gate 354 is low and as a result the output of gate 358 goes high (to provide the round-off "1s") one count later than during Q-bit sample regeneration. Thus the output sequence for Q+1 bit samples consists of Q+1 transmitted bits, a Q, and 7–Q "1s".

The regeneration, conversion, and sample/hold process complete the receiver's operation in processing a typical adaptive PCM frame.

What is claimed is:

1. A system for communicating representations of amplitude varying signals on each of *n* channels at a transmitting station to a receiving station, said system comprising:

sampling means for developing a digital representation of the signal amplitude on each of said *n* channels;

activity update means for determining whether each of said *n* channels is active or inactive;

register means for successively forming multibit output frames each comprised of a sample field and an activity status field;

segmentation means for assigning a different portion of said sample field to each of said active channels and for storing a digital representation of the signal amplitude on each active channel in the sample field portion assigned thereto; and activity status means responsive to said activity update means for storing digital representations of the activity status of different ones of said *n* channels in said successively formed output frames.

2. The system of claim 1 including frame counter means for cyclically defining *n* successive frame counts; and wherein said register means forms one of said multibit output frames during each of said *n* frame counts.

3. The system of claim 2 wherein said activity status means stores the activity status of a different one of said *n* channels in each of *n* successively formed frames.

4. The system of claim 2 wherein said activity update means includes:

active channel register means for storing the activity status of each of said *n* channels; and means for comparing the average signal amplitude on each of said channels over a predetermined number of frame counts with a threshold level and for storing an active indicator in said active channel register when said average signal amplitude is greater than said threshold level and an inactive indicator in said active channel register when said average signal amplitude is less than said threshold level.

5. The system of claim 4 wherein said sampling means includes means for sampling the signal amplitude on each of said *n* channels a multiple number of times during each *n* frame count cycle and for providing a digital representation of each such sample; and wherein said means for comparing includes *n* sum registers for storing the sum of said sample digital representations accumulated over a period of *n* frame counts.

6. The system of claim 2 wherein said register means forms a fixed multibit length sample field; and wherein said segmentation means includes:

means for determining during each frame count the total number of active channels; and means for determining the number of bits of said fixed multibit length which can be assigned to each of said active channels.

7. The system of claim 2 wherein said register means forms a fixed multibit length sample field; and wherein said segmentation means includes:

means for determining during each frame count the total number A of active channels;

means for determining the length Q of equal bit length sample field portions within said fixed multibit length sample field which can be assigned to each of said active channels; and means responsive to said fixed multibit length exceeding the product AQ by a remainder R for increasing the bit length of R sample field portions to Q + 1.

8. The system of claim 7 wherein said means for increasing the bit length of sample field portions includes:

means responsive to the count defined by said frame counter for increasing the bit length of different groups of R sample field portions dependent on said frame count.

9. The system of claim 2 wherein said register means includes first and second identical registers;

means for alternatively coupling said segmentation means to said first and second registers during successive frame counts to form said output frame alternately in said first and second registers.

10. The system of claim 9 including output means for reading information out from said first and second registers alternately and out of phase with the coupling of said segmentation means thereto.

11. A system for communication representations of amplitude varying signals on up to *n* Input channels at a transmitting station over a common communication link to *n* output channels at receiving station, said system comprising:

transmitter means including:

sampling means for developing an M-bit representation of the signal amplitude on each of said *n* channels;

activity update means for determining which of said *n* channels are active and the total number A of active channels;

register means for successively forming output frames each comprised of a sample field having a fixed number of bits F;

segmentation means responsive to the product A·M exceeding said fixed number F for truncating those M-bit representations corresponding to active channels and for storing Q-bit length representations in said register means where the product A·Q ≤ F;

output means for applying said output frames formed in said register means to said common communication link; and receiver means coupled to said common communication link and responsive to said Q-bit representations for reforming M bit representations.

12. The system of claim 11 wherein each of said output frames further includes an activity status field;

said transmitter means further including activity status means responsive to said activity update means for storing digital representations of the activity status of different ones of said *n* channels in said successively formed output frames; and said receiver means further including means responsive to said activity status representations for applying said reformed M bit representations to appropriate ones of said *n* output channels.

13. The system of claim 12 including frame counter means for cyclically defining *n* successive frame counts; and wherein said register means forms one of said output frames during each of said *n* frame counts; and wherein said activity status means stores the activity status of a different one of said *n* input channels in each of *n* successively formed frames.

14. A method of communicating amplitude of varying signals on *n* input channels over a common communication link to *n* output channels, said method comprising:

sampling each of said *n* input channels and generating an M-bit digital representation of the signal amplitude in each channel;

determing which of said *n* input channels are active and the total number A of active input channels;

forming successive output frames each including (1) a sample field having F bits comprised of A sample field portions each having said M bits if $F \geq A{\cdot}M$ and comprised of A sample field portions each having Q bits if $A{\cdot}M>F$ where $Q<M$ and $A{\cdot}Q \leq F$ and (2) an activity status field, the activity status field in each output frame identifying the activity status of a different one of said *n* input channels.

* * * * *